United States Patent
Boren et al.

(10) Patent No.: US 7,419,637 B2
(45) Date of Patent: Sep. 2, 2008

(54) OXIDES OF MANGANESE PROCESSED IN CONTINUOUS FLOW REACTORS

(75) Inventors: Richard M. Boren, Bakersfield, CA (US); Charles F. Hammel, Escondido, CA (US)

(73) Assignee: Enviroscrub Technologies Corporation, Minneapolis, MN (US)

( * ) Notice: Subject to any disclaimer, the term of this patent is extended or adjusted under 35 U.S.C. 154(b) by 710 days.

(21) Appl. No.: 10/767,460

(22) Filed: Jan. 28, 2004

(65) Prior Publication Data

US 2004/0258609 A1  Dec. 23, 2004

Related U.S. Application Data

(60) Provisional application No. 60/443,302, filed on Jan. 28, 2003.

(51) Int. Cl.
*B01L 3/02* (2006.01)
(52) U.S. Cl. .................. 422/100; 422/109; 422/69; 422/146; 422/147; 422/198; 436/79
(58) Field of Classification Search .......... 422/69, 422/109–110, 146–147, 105, 170, 180, 198, 422/100; 436/79
See application file for complete search history.

(56) References Cited

U.S. PATENT DOCUMENTS

| | | | |
|---|---|---|---|
| 1,178,927 A | 4/1916 | Kaplan | 423/605 |
| 1,275,666 A | 8/1918 | Ellis | 423/605 |
| 1,293,461 A | 2/1919 | Kaplan | 423/605 |
| 1,851,312 A | 3/1932 | Huff | 423/222 |
| 2,123,250 A | 7/1938 | Muller et al. | 23/145 |
| 2,486,530 A | 11/1949 | Jenness | 252/186 |
| 2,608,466 A | 8/1952 | Fox | 23/145 |
| 2,956,860 A | 10/1960 | Welsh | 23/145 |

(Continued)

FOREIGN PATENT DOCUMENTS

DE  33 12 890  10/1984

(Continued)

OTHER PUBLICATIONS

Donne et al., "The Chemostat: A Novel Approach to the Synthesis of Manganese dioxide", Materials Research Bulletin, vol. 30, No. 7, pp. 859-869, 1995.

(Continued)

*Primary Examiner*—Brian R. Gordon
(74) *Attorney, Agent, or Firm*—Fredrickson & Byron, P.A.

(57) ABSTRACT

Methods and systems for regenerating and pretreating oxides of manganese and precipitation of oxides of manganese from manganese salt solutions. Oxides of manganese, a slurry containing oxides of manganese or manganese salt solutions are mixed with heated aqueous oxidizing solutions and processed in a continuous process reactor. Temperature, pressure, Eh value, and pH value of the mixed solution are monitored and adjusted so as to maintain solution conditions within the $MnO_2$ stability area during processing. This results in regenerated, pretreated and precipitated oxides of manganese having high or increased pollutant loading capacities and/or oxidation states. Oxides of manganese thus produced are, amongst other uses; suitable for use as a sorbent for capturing or removing target pollutants from industrial gas streams. Filtrate process streams containing useful and recoverable value present as spectator ions may be further processed to produce useful and marketable by-products.

8 Claims, 11 Drawing Sheets

U.S. PATENT DOCUMENTS

| | | | |
|---|---|---|---|
| 2,984,545 A | 5/1961 | Tarbutton | 23/178 |
| 3,011,867 A | 5/1961 | Welsh | 23/61 |
| 3,150,923 A | 9/1964 | Bienstock | 423/244.06 |
| 3,226,192 A | 12/1965 | Atsukawa | 23/167 |
| 3,251,649 A | 5/1966 | Atsukawa | 23/167 |
| 3,330,096 A | 7/1967 | Zimmerley | 55/73 |
| 3,427,128 A | 2/1969 | Schmier | 23/145 |
| 3,723,598 A | 3/1973 | Spedden | 423/244 |
| 3,770,868 A | 11/1973 | Lean | 423/5 |
| 3,780,158 A | 12/1973 | Welsh | 423/49 |
| 3,798,310 A | 3/1974 | Atsukawa | 423/244 |
| 3,898,320 A | 8/1975 | Atsukawa | 423/605 |
| 3,933,128 A | 1/1976 | Cramer | 122/4 |
| 3,951,765 A | 4/1976 | Everett | 204/96 |
| 3,956,189 A | 5/1976 | Warshaw | 252/466 |
| 3,957,949 A | 5/1976 | Senjo | 423/235 |
| 3,981,971 A | 9/1976 | Saito | 423/239 |
| 4,006,217 A | 2/1977 | Faber | 423/605 |
| 4,008,169 A | 2/1977 | McGauley | 252/191 |
| 4,011,298 A | 3/1977 | Fukui | 423/235 |
| 4,012,487 A | 3/1977 | Merkl | 423/242 |
| 4,014,982 A | 3/1977 | Paull | 423/528 |
| 4,017,586 A | 4/1977 | Reeves | 423/242 |
| 4,029,752 A | 6/1977 | Cahn | 423/563 |
| 4,033,113 A | 7/1977 | Cramer | 60/39 |
| 4,070,441 A | 1/1978 | Pessel | 423/242 |
| 4,081,509 A | 3/1978 | Hishinuma | 423/235 |
| 4,087,372 A | 5/1978 | Saitoh | 252/184 |
| 4,091,075 A | 5/1978 | Pessel | 423/242 |
| 4,102,982 A | 7/1978 | Weir | 423/242 |
| 4,108,969 A | 8/1978 | Merkl | 423/560 |
| 4,112,053 A | 9/1978 | Sanada | 423/239 |
| 4,123,499 A | 10/1978 | Welsh | 423/35 |
| 4,123,507 A | 10/1978 | Hass | 423/574 |
| 4,133,309 A | 1/1979 | Köhler | |
| 4,144,144 A | 3/1979 | Radimer | 205/347 |
| 4,153,429 A | 5/1979 | Matthews | 55/68 |
| 4,162,207 A | 7/1979 | Boyer | 204/157 |
| 4,164,545 A | 8/1979 | Scott | 423/239 |
| 4,233,188 A | 11/1980 | Gandhi | 252/470 |
| 4,250,149 A | 2/1981 | Welsh | 423/50 |
| 4,276,268 A | 6/1981 | Welsh | 423/49 |
| 4,277,255 A | 7/1981 | Apelgren | 55/20 |
| 4,277,360 A | 7/1981 | Mellors | 252/182 |
| 4,309,386 A | 1/1982 | Pirsh | 422/177 |
| 4,309,392 A | 1/1982 | Shaw | 423/239 |
| 4,310,494 A | 1/1982 | Welsh | 423/49 |
| 4,369,108 A | 1/1983 | Bertolacini | 208/120 |
| 4,369,130 A | 1/1983 | Bertolacini | 252/455 |
| 4,369,167 A | 1/1983 | Weir | 423/210 |
| 4,376,103 A | 3/1983 | Bertolacini | 423/244 |
| 4,381,991 A | 5/1983 | Bertolacini | 208/113 |
| 4,400,362 A | 8/1983 | Lerner | 423/235 |
| 4,402,931 A | 9/1983 | Tanabe | 423/605 |
| 4,411,878 A | 10/1983 | Welsh | 423/605 |
| 4,423,019 A | 12/1983 | Bertolacini | 423/244 |
| 4,448,760 A | 5/1984 | Welsh | 423/605 |
| 4,450,148 A | 5/1984 | Welsh | 423/605 |
| 4,476,104 A | 10/1984 | Mellors | 423/605 |
| 4,479,877 A | 10/1984 | Guter | 210/670 |
| 4,497,902 A | 2/1985 | Bertolacini | 502/65 |
| 4,500,281 A | 2/1985 | Beardmore | 431/3 |
| 4,542,116 A | 9/1985 | Bertolacini | 502/65 |
| 4,550,098 A | 10/1985 | Gens | 502/324 |
| 4,551,254 A | 11/1985 | Imada | 210/688 |
| 4,552,734 A | 11/1985 | Iannicelli | 423/230 |
| 4,552,735 A | 11/1985 | Iannicelli | 423/224 |
| 4,581,210 A | 4/1986 | Teller | 423/242 |
| 4,581,219 A | 4/1986 | Imada | 423/605 |
| 4,713,225 A | 12/1987 | Iannicelli | 423/230 |
| 4,719,791 A | 1/1988 | Greiner | 73/38 |
| 4,755,499 A | 7/1988 | Neal | 502/415 |
| 4,798,711 A | 1/1989 | Neal | 423/239 |
| 4,836,993 A | 6/1989 | Bertolacini | 423/244 |
| 4,843,980 A | 7/1989 | Markham | 110/342 |
| 4,871,522 A | 10/1989 | Doyle | 423/239 |
| 4,872,989 A | 10/1989 | Pirotta | 210/638 |
| 4,883,647 A | 11/1989 | Kainer | 423/239 |
| 4,908,194 A | 3/1990 | Hooper | 423/235 |
| 4,915,922 A | 4/1990 | Filss | 423/239 |
| 4,921,689 A | 5/1990 | Walker | 423/605 |
| 4,923,688 A | 5/1990 | Iannicelli | 423/224 |
| 4,925,633 A | 5/1990 | Doyle | 422/171 |
| 4,940,569 A | 7/1990 | Neal | 423/239 |
| 4,944,878 A | 7/1990 | Lockridge | 210/683 |
| 4,954,324 A | 9/1990 | Hooper | 423/239 |
| 5,000,930 A | 3/1991 | Boguslawski | 423/239 |
| 5,009,872 A | 4/1991 | Chuang | 423/245 |
| 5,023,063 A | 6/1991 | Stiles | 423/239 |
| 5,059,406 A | 10/1991 | Sheth | 423/244 |
| 5,112,796 A | 5/1992 | Iannicelli | 502/402 |
| 5,176,888 A | 1/1993 | Stiles | 423/239 |
| 5,192,515 A | 3/1993 | Gardner-Chavis et al. | 423/213 |
| 5,199,263 A | 4/1993 | Green | 60/670 |
| 5,200,160 A | 4/1993 | Benson | 423/235 |
| 5,246,554 A | 9/1993 | Cha | 204/157 |
| 5,277,890 A | 1/1994 | Wang | 423/605 |
| 5,348,726 A | 9/1994 | Wang | 423/605 |
| 5,352,269 A | 10/1994 | McCandlish | 75/351 |
| 5,358,643 A | 10/1994 | McClintock | 210/709 |
| 5,366,710 A | 11/1994 | Chou | 423/235 |
| 5,384,301 A | 1/1995 | Flytzani-Stephanopoulos | 502/304 |
| 5,391,218 A | 2/1995 | Jorgenson | 95/20 |
| 5,391,365 A | 2/1995 | Wang | 423/605 |
| 5,439,658 A | 8/1995 | Johnson | 423/243 |
| 5,456,892 A | 10/1995 | Yang | 423/239 |
| 5,505,766 A | 4/1996 | Chang | 95/134 |
| 5,534,234 A | 7/1996 | Reddin | 423/50 |
| 5,556,545 A | 9/1996 | Volchek | 210/651 |
| 5,607,496 A | 3/1997 | Brooks | 75/670 |
| 5,635,073 A | 6/1997 | Aktor | 210/714 |
| 5,658,544 A | 8/1997 | Goodes | 423/230 |
| 5,672,323 A | 9/1997 | Bhat | 422/172 |
| 5,700,439 A | 12/1997 | Goyette | 423/230 |
| 5,712,219 A | 1/1998 | Klabunde | 502/328 |
| 5,780,000 A | 7/1998 | Strickland | 423/220 |
| 5,798,088 A | 8/1998 | Dorchak | 423/567 |
| 5,853,684 A | 12/1998 | Fang | 423/244 |
| 5,866,014 A | 2/1999 | Santina | 210/716 |
| 5,871,703 A | 2/1999 | Alix | 423/210 |
| 5,888,926 A | 3/1999 | Biswas | 502/406 |
| 5,955,045 A | 9/1999 | Baur | 423/239.1 |
| 5,955,393 A | 9/1999 | Moskovitz | 502/5 |
| 6,010,666 A | 1/2000 | Kurokawa | 422/122 |
| 6,039,783 A | 3/2000 | Lueck | 71/59 |
| 6,066,590 A | 5/2000 | Horii | 502/324 |
| 6,085,440 A | 7/2000 | Getler | 34/314 |
| 6,102,039 A | 8/2000 | Springett | 128/206.12 |
| 6,117,333 A | 9/2000 | Frankiewicz | 210/705 |
| 6,117,403 A | 9/2000 | Alix | 423/210 |
| 6,132,692 A | 10/2000 | Alix | 423/210 |
| 6,162,530 A | 12/2000 | Xiao | 428/292 |
| 6,214,303 B1 | 4/2001 | Hoke | 423/210 |
| 6,214,304 B1 | 4/2001 | Rosenthal | 423/210 |
| 6,248,217 B1 | 6/2001 | Biswas | 204/157 |
| 6,338,830 B1 | 1/2002 | Moskovitz | 423/210 |
| 6,368,510 B2 | 4/2002 | Friot | 210/670 |
| 6,398,968 B1 | 6/2002 | Higby | 210/721 |
| 6,517,802 B1 | 2/2003 | Xiao | 423/263 |
| 6,558,556 B1 | 5/2003 | Khoe | 210/758 |
| 6,579,509 B1 | 6/2003 | Otsuka | 423/245 |
| 6,599,429 B1 | 7/2003 | Azizian | 210/681 |
| 2002/0006363 A1 | 1/2002 | Feeley | 422/171 |

| | | | |
|---|---|---|---|
| 2002/0070172 A1 | 6/2002 | Schlegel | 210/660 |
| 2002/0074292 A1 | 6/2002 | Schlegel | 210/681 |
| 2002/0168302 A1 | 11/2002 | Pahlman | |
| 2003/0077249 A1 | 4/2003 | Bebbington | 424/93 |
| 2003/0077398 A1 | 4/2003 | Strutt | 427/452 |
| 2003/0196960 A1 | 10/2003 | Hughes | 210/679 |
| 2003/0196966 A1 | 10/2003 | Hughes | 210/758 |
| 2003/0209495 A1 | 11/2003 | Schlegel | 210/660 |
| 2004/0109800 A1* | 6/2004 | Pahlman et al. | 423/210 |
| 2004/0109821 A1 | 6/2004 | Koyanaka | |

FOREIGN PATENT DOCUMENTS

| | | |
|---|---|---|
| DE | 37 31 889 | 4/1989 |
| DE | 40 12 982 | 10/1991 |
| DE | 197 15 244 | 10/1998 |
| EP | 0 428 389 | 5/1991 |
| EP | 0 476 300 | 1/1995 |
| JP | 08266859 | 10/1996 |
| WO | WO 98/17365 | 4/1998 |
| WO | WO 01/77031 | 10/2001 |
| WO | WO 01/87464 | 11/2001 |
| WO | 2004/009232 | 2/2002 |
| WO | WO 02/081376 | 10/2002 |

OTHER PUBLICATIONS

Ambrose, Covington and Thirsk, "Electrode Potentials and related Properties of Some Potassium-Containing alpha Manganese Dioxides," Power Sources, 1970, 2, pp. 303-318.

Clapper, TW, "Manganese," Encyclopedia of Chemical Processing and Design, 1988, pp. 102-107.

"Commercial Demonstration of the NOXSO SO2/NO2 Removal flue Gas Clean-up System," Quarterly Technical Progress Report No. 16 Contract No. DE-FC22-91PC90549 date—stamped Dec. 11, 1996.

De Bruijn, et al, "Thermal Decomposition of Aqueous Manganese Nitrate Solutions", Thermal Analysis, ICTA, Berkhaeuser, Verlag, Basel, Boston, Stuttgart, 1980: 393-398.

Elvers, Barbara, Ed., "Manganese," Ullmans Encyclopedia of Industrial Chemistry, Basel, Switzerland?.

Hypolito, Valarelli Giovanoli, Netto, "Gibbs Free Energy of Formation of Synthetic Cryptomelane," Chimia 38 (1984) No. 12 (Dec.), pp. 427-429.

Il'chenko, Kucha, Chernomordik, Andreeva, Ivabova, "Path and Products of Thermal Decomposition of Mn(NO3)2 in Aqueous Nitric Acid Solutions," Plenum Publishing Corp., 1985, Northwest Correspondence Polytechnic Institute, Zhurnal Prikladnoi Khimii, vol. 58, May 21, 1984: pp. 984-989.

Kalagnanam, J. & Rubin ES, "Development of Integrated Environmental Control Model," Quarterly Progress Report DE-AC22-92PC91346-Oct. 12, 1995.

Kanungo, Parida and Sant, "Studies on MnO2—II: Relationship Between Physico . . . Activity . . . Synthetic Mn" Electrochemiica Acta, 26 (8), pp. 1147-1156, 1981? Dec. 15, 1980.

Kapteijn, et. al., "Alumina-Supported Manganese Oxide Catalysts—Part II: Surface Characterization and Adsorbtion of Ammonia and Nitric Oxide," Journal of Catalysis, 150, (May 12, 1994), pp. 105-116.

Kapteijn, et. al., "Alumina-Supported Manganese Oxide Catalysts—Part I: Characterization: Effect Precursor and Loading," Journal of Catalysis, 150, pp. 94-104, Apr. 13, 1994.

Karlsson and Rosenberg, "Flue Gas Denitrification. Selective Catalytic Oxidation of NO and NO2 Am. Chem. Soc.", published in Ind. Chem. Process Des. Dev., 1984: No. 23, pp. 808-814.

Kijlstra, et. al., "Mechanism of the SCR of NO by NH3 Over MnOx/Al2O3—Part I; Adsorption and Desorption of Single Reaction Components," Journal of Catalysis, 171, pp. 208-218, Jun. 2, 1997, article No. CA971788.

Kijlstra, et. al., "Mechanism of the SCR of NO by NH3 Over MnOx/Al2O3—Part II; Reactivity of Adsorbed NH3 and NO Complexes," Journal of Catalysis, 171, pp. 219-230, Jun. 2, 1997, article No. CA971789.

Kinetics of Mn(II) Ion Oxidation in Nitrate Solutions; (to be translated-Russian) ISSN 0041-6045 Jul./Aug. 1994, T. 60, N 8, pp. 540-544 ?.

Lawn, et. al., "The Effects of High-Energy Milling on the Catalytic Behaviour of MnO2," Power Technology, 20 (1978) 207-210, Elsevier Sequoia, S.A.

Powerspan Corp., Powerspan System Overview: ECO™ Technology (Electro-Catalytic Oxidation) www.powerspancorp.com/news/release-11.shtml downloaded Jan. 11, 2002.

Singoredjo, Kapteijn, et. al., "Alumina-Supported Mn Oxides for the Low-Temp. SCR of NO with Ammonia Applied Catalysis B," Environmental, 1 (Aug. 5, 1992) 297-316.

Stiles, et. al., "Selective Catalytic Reduction of NOx in Presence of Oxygen," Ind. Chem. Res . . . , 1994: 33, pp. 2259-2264.

Tarbutton, Jones, Gray and Smith, "Recovery of Sulfur Dioxide from Flue Gases," Industrial and Engineering Chemistry, vol. 49, No. 3, Mar. 1957, pp. 392-395.

Uno, et. al., "A New Dry Process of SO2 Removal From Flue Gas Proceedings," 7th world petroleum congress, vol. 9, pp. 289-295, Elsivier publishing Co, 1967.

Vadjic, et al., "The Effect of MnO2 and Some Mn Salts on the Behaviour of SO2 in the Air," The Science of the Total Environment, 44 (Feb. 18, 1985) 245-251, Elsevier Publishers.

Wu, Shu-Chuan, et al., "Use of Deep Sea Manganese Nodules as Catalysts for Reduction of Nitric Oxide with Ammonia," Atmospheric Environment, Pergamon Press (1972), vol. 6, pp. 309-317.

Supplementary European Search Report mailed Feb. 27, 2008 for corresponding European Patent Application No. 047573860 (3 pages).

* cited by examiner

POURBAIX DIAGRAM AT 25° C WITH $1 \times 10^0$ DISSOLVED MANGANESE CONCENTRATION POURBAIX DIAGRAM AT 25° C WITH $1 \times 10^{-6}$ DISSOLVED MANGANESE CONCENTRATION

REGENERATION OF LOADED SORBENT

PRE-TREATMENT OF VIRGIN SORBENT

PRECIPITATION OF VIRGIN OXIDES OF MANGANESE SORBENT

ELECTROLYTIC CELL & BY-PRODUCTS

OXIDES OF MANGANESE PROCESSED IN CONTINUOUS FLOW REACTORS

RELATED APPLICATIONS

This application claims priority to U.S. Provisional Application No. 60/443,302, filed Jan. 28, 2003, which is incorporated herein by reference.

FIELD OF THE INVENTION

The invention relates to systems and processes for pretreatment, regeneration and formation of oxides of manganese that have high oxidation states and/or high pollutant loading capacities which are suitable, amongst other uses, as a sorbent for capture and removal of target pollutants from industrial and other gas streams. Further, the invention relates to oxides of manganese so treated, regenerated or formed.

BACKGROUND OF THE INVENTION

Oxides of manganese are utilized for a number of industrial applications, such as pollution control systems, steel manufacture, batteries and catalytic converters, to name a few. Of particular, but not exclusive, interest to Applicants is the use of oxides of manganese in pollution control systems. Applicants are co-inventors of the subject matter of issued U.S. Pat. Nos. 6,579,507 and 6,610,263, the disclosures of which are incorporated herein by reference. These patents disclose pollutant removal systems and processes, sometimes referred to as Pahlman™ systems and processes, which utilize dry and wet removal techniques and combinations thereof, incorporating the use of oxides of manganese as a sorbent for capture and removal of target pollutants from gas streams.

The term "target pollutant," as used herein, refers to the pollutant or pollutants that are to be captured and removed from a gas stream. Examples of target pollutants that may be removed with an oxide of manganese sorbent include, but are not limited to, oxides of nitrogen ($NO_X$), oxides of sulfur ($SO_X$), mercury (elemental, oxidized and particulate forms), mercury compounds, $H_2S$, totally reduced sulfides (TRS), mercaptans, chlorides, such as hydrochloric acid (HCl), oxides of carbon (CO and $CO_2$) and other heavy metals present in utility and other industrial process and waste gas streams.

Before going further, the following additional definitions will be useful with respect to this background discussion and to the understanding of the invention disclosed herein:

"Reacted" or "loaded," as used interchangeably herein, refers in conjunction with "oxides of manganese" and/or "sorbent" to oxides of manganese or sorbent that has interacted with one or more target pollutants in a gas whether by chemical reaction, adsorption or absorption. The term does not mean that all reactive or active sites of the sorbent have been utilized as all such sites may not actually be utilized.

"Unreacted" or "virgin," as used interchangeably herein, refers in conjunction with "oxides of manganese" and/or "sorbent" to oxides of manganese or sorbents that have not interacted with target pollutants in a gas or gas stream.

"Nitrates of manganese," as used herein, refers to and includes the various forms of manganese nitrate, regardless of chemical formula, that may be formed through the chemical reaction between $NO_X$ and the sorbent and includes hydrated forms as well.

"Sulfates of manganese," as used herein, refers to and includes the various forms of manganese sulfate, regardless of chemical formula that may be formed through the chemical reaction between $SO_X$ and the sorbent and includes hydrated forms as well.

Oxides of manganese in various forms, utilized as sorbents, are introduced into the reaction zones of Pahlman™ systems or other pollution removal systems and interact with the target pollutants in gas streams routed through the systems as a catalyst, a reactant, an absorbent or an adsorbent. During such interaction in the process of pollutant removal, the oxidation (or valence) state of the oxides of manganese sorbent is reduced from its original state during reaction with the target pollutants. For example, where the target pollutants are $NO_X$ or $SO_X$, pollutant removal occurs possibly through overall reactions such as the following:

$$SO_2 + MnO_2 \rightarrow MnSO_4 \qquad \text{Reaction (1)}$$

$$2NO + O_2 + MnO_2 \rightarrow Mn(NO_3)_2 \qquad \text{Reaction (2)}$$

In both of the reactions above, manganese (Mn) is reduced from the +4 valence state to +2 valence state during formation of the reaction products shown. It should be noted that the actual reactions may include other steps not shown, and that indicating Reactions 1 and 2 is solely for illustrative purposes.

The element manganese (Mn), and therefore oxides of manganese, may exist in six different valence (oxidation) states. Of particular interest and usefulness for gaseous pollutant removal are those oxides of manganese having valence states of +2, +3, and +4, which correspond to the oxides MnO, $Mn_2O_3$, $MnO_2$ and $Mn_3O_4$. The oxide $Mn_3O_4$ is believed to be a solid-solution of both the +2 and +3 states.

A characteristic of most oxides of manganese species is non-stoichiometry. For example; most $MnO_2$ species typically contain on average less than the theoretical number of 2 oxygen atoms, with numbers more typically ranging from 1.5 to 2.0. The non-stoichiometry characteristic of oxides of manganese is thought to result from solid-solution mixtures of two or more oxide species (such as may occur in the oxide $Mn_3O_4$), or distortions of molecular structure and exists in all but the beta ($\beta$), or pyrolusite, form of manganese dioxide. Oxides of manganese having the formula $MnO_X$ where X is about 1.5 to about 2.0 are particularly suitable for use as sorbent for dry removal of target pollutants from gas streams and may be also be utilized in wet removal. However, the most active types of oxides of manganese for use as a sorbent for target pollutant removal usually have the formula $MnO_{1.7 \text{ to } 1.95}$, which translates into average manganese valence states of +3.4 to +3.9, as opposed to the theoretical +4.0 state. It is unusual for average valence states above about 3.9 to exist in most forms of oxides of manganese.

Oxides of manganese are known to exhibit several identifiable crystal structures, which result from different assembly combinations of their basic molecular structural units. These basic structural "building block" units are $MnO_6$ octahedra, which consist of one manganese atom at the geometric center, and one oxygen atom at each of the six apex positions of an octahedral geometrical shape. The octahedra may be joined together along their edges and/or corners, to form "chain" patterns, with void spaces ("tunnels"). Regular (and sometimes irregular) three-dimensional patterns consist of layers of such "chains" and "tunnels" of joined octahedra. These crystalline geometries are identified by characteristic x-ray diffraction (XRD) patterns. Most oxides of manganese are classifiable into one or more of the six fundamental crystal structures, which are called alpha ($\alpha$), beta ($\beta$), gamma ($\gamma$), delta ($\delta$), epsilon ($\epsilon$), and ramsdellite. Certain older literature also included rho ($\rho$) and lambda ($\lambda$) structures, which are now thought obsolete, due partly to improvements in XRD technique. Some (amorphous) forms of $MnO_2$ exhibit no crystalline structure.

Certain characteristics of oxides of manganese probably arise from the size and shape of voids within these crystalline patterns and from certain elements, and compounds, which may occupy the voids and appear to help prevent collapse of certain structures. Applicants believe that these characteristics in addition to the oxidation state may have an affect upon the loading capacity of oxides of manganese sorbent. Further, many oxides of manganese, including those that are the subject of the present application, come in hydrated or hydrous forms, having water chemically bound or combined to or within their crystalline structures, containing one or more molecules of water; this is sometimes referred to as bound water, structural water, water of crystallization or water of hydration. In these forms, the water is combined is such a way that it may be removed with sufficient heat without substantially changing the chemical structure of the oxides of manganese. Such oxides of manganese are also useful as a sorbent. This bound water may also contribute to the chemical reactivity and possibly catalytic behavior of the species.

Some oxides of manganese have the ability to absorb oxygen from gas. Manganous oxide (MnO) and $Mn(OH)_2$ will oxidize to $MnO_2$ in the presence of air, for example. Additionally, the dioxides of manganese are themselves oxidizers. They readily exchange oxygen in chemical reactions and are known to have catalytic properties. This oxygen exchange ability may be related to proton mobility and lattice defects common within most $MnO_2$ crystal structures.

The oxidizing potential of $MnO_2$ is advantageously utilized in target pollutant removal in the Pahlman™ and other pollutant removals systems and processes. Target pollutants, such as $NO_X$, $SO_2$, CO, and $CO_2$ gases, mercury (Hg) and other pollutants, require oxidation of the species prior to reaction with $MnO_2$ sorbent to form reaction products, such as manganese sulfates, nitrates, and carbonates, mercury compounds, and other corresponding reaction products, in order for them to be captured and removed from gas streams.

Manganese compounds or salts are formed in the pollutant removal process and may be soluble in water. This is, for example, true for manganese sulfate and nitrate formed by the removal of $SO_X$ and $NO_X$. This property allows the reaction products formed on the surface of oxides of manganese sorbent particles to be readily dissolved and removed from the sorbent particles in aqueous solutions by disassociation into reaction product anions, such as sulfate or, nitrate, and manganese cations such as $Mn^{+2}$ cations.

Manganese dioxides are divided into three origin-based categories, which are: 1) natural (mineral) manganese dioxide (NMD), 2) chemical manganese dioxide (CMD), and 3) electrolytic manganese dioxide (EMD). As implied, NMD occurs naturally as various minerals, which may be purified by mechanical or chemical means. The most common form of NMD is pyrolusite ($\beta$-$MnO_2$), which is inexpensive, but has rather low chemical activity and therefore low pollutant loading capacity. CMD and EMD varieties are synthetic oxides of manganese. EMD is produced primarily for the battery industry, which requires relatively high bulk density (which often results from relatively large, compact particles), relatively high purity, and good electrochemical activity. Though useful as sorbent, characteristics such as low surface area and large compact particle size make EMD somewhat inferior to CMD for gas removal applications, despite its good electrochemical activity. Chemically synthesized oxides of manganese of all kinds fall into the CMD category and includes chemically treated or pretreated oxides of manganese. In chemical synthesis, a great deal of control is possible over physical characteristics such as particle size and shape, porosity, composition, surface area, and bulk density in addition to electrochemical or oxidation potential. It is believed that these characteristics contribute to the loading capacity of some oxides of manganese.

Oxides of manganese have the ability to capture target pollutants from gas streams, however, the low pollutant loading rates achieved with various prior art oxides of manganese have made some industrial applications of this ability uneconomical. The low target pollutant loading rates of various prior art oxides of manganese sorbents would require voluminous amounts to effectively capture large quantities of target pollutants that exist at many industrial sites, e.g., $NO_X$ and/or $SO_2$. The large quantity of sorbent that would be required to capture $NO_X$ and/or $SO_2$ could result in an overly costly pollutant removal system and sorbent regeneration system. It would therefore be desirable to enhance the loading capacities of the oxides of manganese sorbent in order to economically implement a pollution removal system utilizing oxides of manganese.

It is believed that reaction products, such as the manganese salts of Reaction (1) and Reaction (2) above, form on the surfaces of the sorbent particles of oxides of manganese. These reactions may extend to some depth inside the sorbent particles and into the pores, interstices or micro fissures. Applicants believe that formation of such reactions products occurs primarily on the surfaces of the oxides of manganese particles, resulting in a layer or coating, which effectively isolates the covered portion of the particle surface and thereby prevents continued rapid reaction with additional target pollutants. Further, the oxidation state and thus the loading capacity of the oxides of manganese below the surface of the reaction product coating may be reduced during the pollutant removal, thus diminishing the loading capacity of sorbent even after the reaction product have been removed or disassociated into an aqueous solution. It would therefore be desirable for economic reasons to re-use or regenerate the unreacted portions of the sorbent for subsequent cycles of pollutant gas removal.

In order to regenerate the reacted oxides of manganese effectively for subsequent re-use as a gas sorbent with high removal efficiencies and target pollutant loading rates, it is advantageous to: (1) remove soluble reaction products or reaction product salts, such as salts $MnSO_4$, $Mn(NO_3)_2$, $MnCl_2$ and other manganese halides, manganese salt reaction products, and the like, from the sorbent particle surfaces with an aqueous solution through disassociation into their constituent cations and anions, e.g., $Mn^{+2}$, $Cl^{-1}SO_4^{-2}$, and $NO^{3-1}$ ions (2) restore or increase the target pollutant loading capacity and/or oxidation state of the remaining solid oxides of manganese sorbent below the surface of the reaction product coating that is not dissociated in an aqueous solution, (3) recover, through precipitation, the $Mn^{+2}$ ions that were dissociated into solution from the reaction products formed through reactions with the various target pollutants; and (4) to recover other ions and form marketable or otherwise useful by-products. Note that some soluble and insoluble reaction products may be removed through thermal decomposition.

It would also be desirable to perform steps 2 and 3 as noted above in a continuous flow reactor capable of operating under specific temperatures, pressures, pH, Eh, and constituent molar concentrations.

Applicants have developed methods of producing newly precipitated oxides of manganese, of treating commercially available virgin oxides of manganese, and of regenerating loaded oxides of manganese in a continuous flow reactor that results in the production of oxides of manganese useful, amongst other applications as sorbent for pollutant removal. Oxides of manganese so produced may exhibit high or increased loading capacity and/or valence states as compared to reacted and virgin oxides of manganese of various forms, including a variety of commercially available oxides of manganese. Applicants have additionally developed a system and process for cyclically loading, with target pollutants, and regenerating oxides of manganese sorbent utilizing a continuous flow reactor that results in the production of useful byproducts.

SUMMARY OF THE INVENTION

Figure 1:
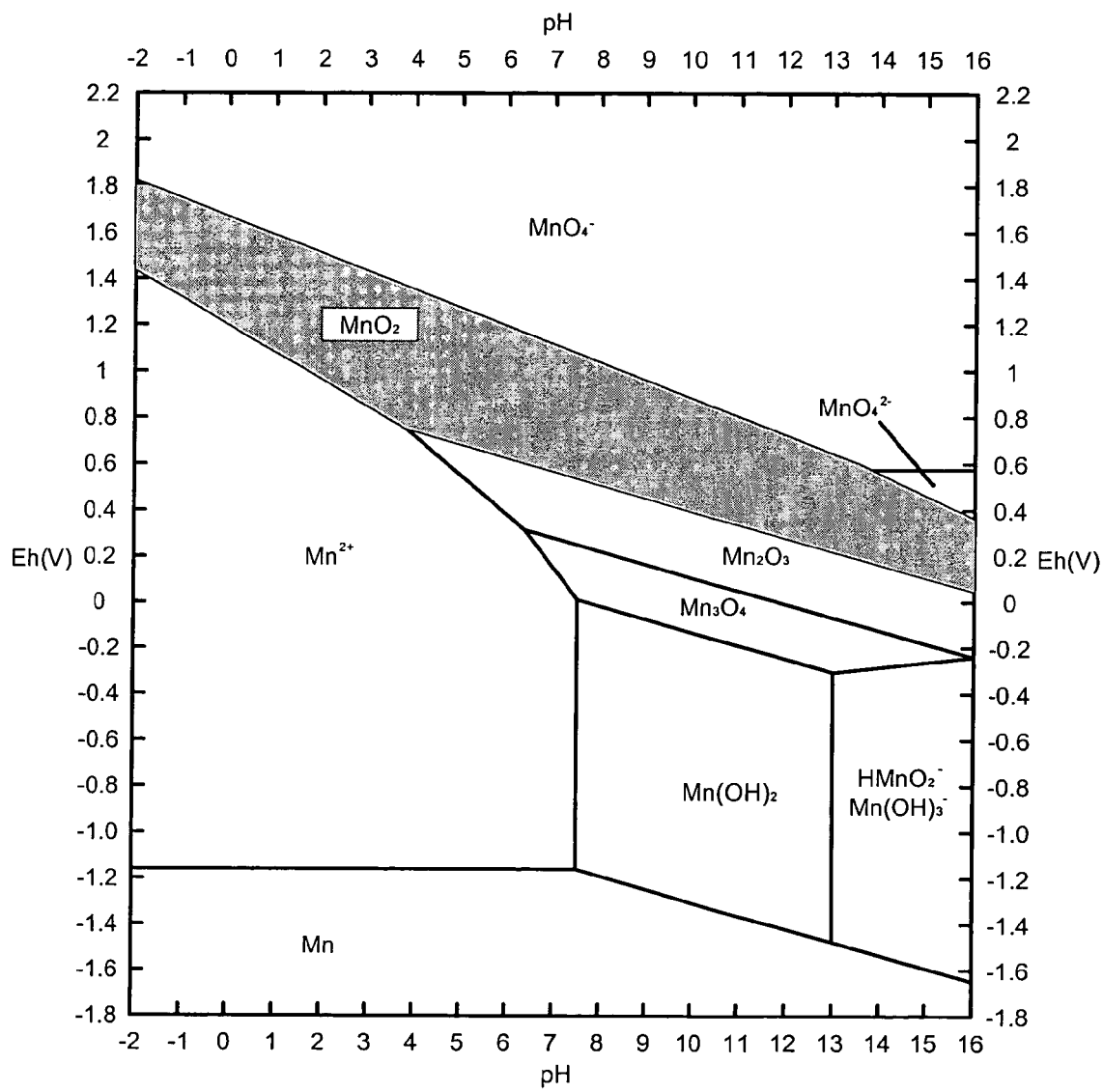
FIG. 1 is a Pourbaix diagram for an aqueous solution of 1 mole/liter manganese ion concentration.

The invention relates to methods and systems and processes for regeneration, precipitation and pretreatment of oxides of manganese that, amongst other uses, are utilized as a sorbent for removal of target pollutants from a gas stream. The oxides of manganese processed in the methods and systems of the invention exhibit high pollutant loading capacities and/or oxidation states as appropriately compared to virgin oxides of manganese.

In an embodiment of the invention, a method for rapid and adaptive processing of oxides of manganese comprises the steps of: a) providing a manganese containing solution selected from the group consisting of a slurry of virgin oxides of manganese, a regeneration slurry containing rinsed reacted oxides of manganese, a slurry of loaded oxides of manganese containing disassociated manganese cations, a manganese salt solution containing disassociated manganese cations; b) providing a aqueous oxidizing solution, the oxidizing solution being prepared to have Eh and pH values within a permanganate stability area or an $MnO_2$ stability area or to move solution conditions initially into the permanganate stability area or an $MnO_2$ stability area when contacted with the manganese containing solution; c) feeding the manganese containing solution and the aqueous oxidizing solution into at least one continuous flow reactor, the solutions being fed either separately into the continuous flow reactor where they mix to form a combined mixed processing solution or being premixed and fed as a combined mixed processing solution; d) heating the combined mixed processing solution to process temperature; e) monitoring and adjusting combined mixed processing solution temperature, Eh value, pH value, molarity, and pressure within the continuous flow reactor so as to rapidly and adaptively move combined mixed processing solution conditions into and maintain processing solution conditions within the $MnO_2$ stability area; and f) maintaining combined mixed processing solution conditions within the $MnO_2$ stability area as the combined mixed processing solution travels through the continuous flow reactor so as to produce oxides of manganese selected from the group comprising regenerated oxides of manganese, pretreated oxides of manganese, precipitated oxides, and regenerated and precipitated oxides of manganese.

In another embodiment of the invention, a method for rapid and adaptive processing of oxides of manganese comprised the steps of: a) providing a heated manganese containing solution selected from the group consisting of a slurry of virgin oxides of manganese, a regeneration slurry containing rinsed reacted oxides of manganese, a slurry of loaded oxides of manganese containing disassociated manganese cations, a manganese salt solution containing disassociated manganese cations; b) providing a heated aqueous oxidizing solution, the oxidizing solution being prepared to have Eh and pH values within a permanganate stability area or an $MnO_2$ stability area or to move solution conditions initially into the permanganate stability area or an $MnO_2$ stability area when contacted with the manganese containing solution; c) feeding the manganese containing solution and the aqueous oxidizing solution into at least one continuous flow reactor, the solutions being fed either separately into the continuous flow reactor where they mix to form a combined mixed processing solution or being premixed and fed as a combined mixed processing solution; d) monitoring and adjusting combined mixed processing solution temperature, Eh value, pH value, molarity, and pressure within the continuous flow reactor so as to rapidly and adaptively move combined mixed processing solution conditions into and maintain processing solution conditions within the $MnO_2$ stability area; and e) maintaining combined mixed processing solution conditions within the $MnO_2$ stability area as the combined mixed processing solution travels through the continuous flow reactor so as to produce oxides of manganese selected from the group comprising regenerated oxides of manganese, pretreated oxides of manganese, precipitated oxides, and regenerated and precipitated oxides of manganese.

The aforementioned embodiments of the invention may further comprise the step of heating the combined mixed processing solution within the continuous flow reactor to a temperature at or above 100° C.

The aforementioned embodiments of the invention may further comprise the step of heating the combined mixed processing solution within the continuous flow reactor to a temperature above 100° C. after, wherein the manganese containing solution and the aqueous oxidizing solution are heated to a temperature of about 100° C. prior to being fed into the continuous flow reactor.

The aforementioned embodiments of the invention may further comprise the steps of separating the oxides of manganese from the processing solution to provide separated oxides of manganese and a oxidation filtrate, the oxidation filtrate being routed for further processing and handling; and rinsing and filtering the separated oxides of manganese to provide rinsed oxides of manganese and a rinse filtrate, the rinse filtrate being directed further handling and processing.

The aforementioned embodiments of the invention may further comprise the steps of separating the oxides of manganese from the processing solution to provide separated oxides of manganese and a oxidation filtrate, the oxidation filtrate being routed for further processing and handling; rinsing and filtering the separated oxides of manganese to provide rinsed oxides of manganese and a rinse filtrate, the rinse filtrate being directed further handling and processing; and drying and/or comminuting the rinsed oxides of manganese.

The aforementioned embodiments of the invention may further comprise the steps of separating the oxides of manganese from the processing solution to provide separated oxides of manganese and a oxidation filtrate, the oxidation filtrate being routed for further processing and handling; rinsing and filtering the separated oxides of manganese to provide a rinsed oxides of manganese filter cake or and a rinse filtrate, the rinse filtrate being directed further handling and processing; and directing the filter cake to a filter cake feed for introduction into a reaction chamber of a pollutant removal system.

The aforementioned embodiments of the invention may further comprise the steps of separating the oxides of manganese from the processing solution to provide separated oxides of manganese and a oxidation filtrate, the oxidation filtrate being routed for further processing and handling; rinsing and filtering the separated oxides of manganese to provide a rinsed oxides of manganese filter cake or and a rinse filtrate, the rinse filtrate being directed further handling and processing; adding water to the rinsed oxides of manganese to form a oxides of manganese slurry; and directing the oxides of manganese slurry to a feeder selected from the group consisting of slurry feeders, spray feeders, spray injection feeders for introduction into a reaction chamber of a pollutant removal system.

In the various embodiments of the invention, the aqueous oxidizing solution contains an oxidant or oxidizer selected from the group consisting of persulfates, chlorates, perchlorates, permanganates, peroxides, hypochlorites, organic oxidizers, oxygen, air, and ozone.

In another embodiment of the invention a system for rapid and adaptive processing of oxides of manganese is provided. The system of this embodiment comprise a continuous flow reactor, a manganese vessel; an oxidant vessel, a plurality of heating units, a base and/or acid feeder for feeding base or acid to the continuous flow reactor, a least one filtration and/or rinse unit and a controller. The continuous flow reactor is equipped with an orifice, a back pressure valve, probes for measuring temperature, pressure, Eh and pH values of aqueous solutions within the continuous flow reactor. The continuous flow reactor is configured for introduction of an aqueous oxidizing solution and a manganese containing solution a manganese containing solution selected from the group consisting of a slurry of virgin oxides of manganese, a regeneration slurry containing rinsed reacted oxides of manganese, a slurry of loaded oxides of manganese containing disassociated manganese cations, and a manganese salt solution containing disassociated manganese cations. The manganese containing solution and the aqueous oxidizing solution are processed together in the continuous flow reactor as a combined mixed processing solution. The manganese vessel is equipped with a feeder and contains the manganese containing solution. The oxidant vessel is equipped with a feeder and contains a supply of the aqueous oxidizing solution. The oxidizing solution is prepared to have Eh and pH values within a permanganate stability area or an $MnO_2$ stability area or to move solution conditions initially into the permanganate stability area or an $MnO_2$ stability area when contacted with the manganese containing solution. The plurality of heating units are utilized for providing heat to the continuous flow reactor, oxidant vessel, and the manganese vessel. The controller is for simultaneously monitoring and adjusting system operational parameters and regulating system components, the controller being in electronic communication with the probes of the oxidant vessel, the manganese vessel, the continuous flow reactor, the feeders, the at least one filtration and/or rinse unit, the back pressure valve and the heating units. The controller is capable of monitoring and adjusting system operational parameters selected from the group consisting of temperature, pressure, molarity, Eh, pH and feeder rates so as adjust and maintain conditions in the continuous flow reactor within the $MnO_2$ stability area during processing.

The system of this embodiment may further comprise an electrolytic cell for production of oxidant and other useful by-products. The electrolytic cell is configured to receive and process filtrate and rinse solutions from the at least one filtration/rinse unit. The rinse solutions are generated from the separation of oxides of manganese processed in the combined mixed processing solution. The controller may be in electronic communication with and regulates and controls operation of the electrolytic cell.

In another embodiment of the an integrated pollution control and sorbent processing system is provided. The integrated pollution control and sorbent processing system comprises a pollutant removal subsystem for removal of target pollutants from gases and a sorbent processing subsystem for rapid and adaptive processing of oxides of manganese.

In this embodiment of the invention, the pollutant removal subsystem comprises: a feeder containing a supply of sorbent, at least one reaction chamber and a pollutant removal controller, The feeder is configured to handle and feed sorbent. The sorbent comprise oxides of manganese. The at least one reaction chamber is configured to receive sorbent and a gas containing at least one target pollutant. The gas is introduced into the reaction chamber at temperatures ranging from ambient temperature to below the thermal decomposition temperature of a reaction product formed by a reaction between the target pollutant and the sorbent. The gas is contacted with the sorbent for a time sufficient to effect capture of the target pollutant at a targeted capture rate set point. The target pollutant is captured by reacting with the sorbent to form the reaction product to substantially strip the gas of the target pollutant. The reaction chamber is further configured to render the gas that has been substantially stripped of the target pollutant free of reacted and unreacted sorbent so that the gas may be vented from the reaction chamber. Differential pressure within the system is regulated so that any differential pressure across the system is no greater than a predetermined level. The pollutant removal controller provides integrated control of system differential pressure and other operational parameters selected from the group consisting of target pollutant capture rate gas inlet temperature, sorbent feed rate and any combination thereof. Differential pressure within the system is regulated so that any differential pressure across the system is no greater than a predetermined level and the target pollutant is removed at their targeted capture rate set points.

The sorbent processing subsystem of this embodiment of the invention is the same as the above-described embodiment of a system of the invention for rapid and adaptive processing of oxides of manganese. The at least one reactions chamber is selected from the group of reaction zones that includes a fluidized bed, a pseudo-fluidized bed, a reaction column, a fixed bed, a moving bed, a serpentine reactor, a section of pipe or duct, and a cyclone. The integrated pollution control and sorbent processing system of this embodiment of the invention may further comprise conveyors to direct reacted sorbent from the reaction chamber for processing in the sorbent processing subsystem and to direct process sorbent from the sorbent processing subsystem for introduction into the pollutant removal subsystem.

DETAILED DESCRIPTION OF PREFERRED EMBODIMENTS

The following definition will be useful in understanding the invention disclosed herein "$MnO_2$ stability area," as used herein, refers to the region of thermodynamic stability for manganese dioxide delineated by Eh and pH values for aqueous solutions or, phrased alternatively, the domain of $MnO_2$ stability for an aqueous solution at specified temperatures, pressures and molarities. More specifically, it refers to the region or domain delineated by Eh and pH values for aqueous solutions at specified temperatures, pressures and molarities in an electrochemical stability diagram, such as presented by Pourbaix diagrams and their equivalents, such as the Latimer Diagram or the Frost Diagram.

"Permanganate stability area," as used herein, refers to the region of thermodynamic stability for permanganates delineated by Eh and pH values for aqueous solutions at specified temperatures, pressures and molarities. More specifically, it refers to the region of thermodynamic stability for permanganate delineated by Eh and pH values for aqueous solutions at specified temperatures, pressures and molarities in an electrochemical stability diagram, such as presented by Pourbaix diagrams.

"Regenerated oxides of manganese," as used herein, refers to loaded or reacted oxides of manganese that have been processed according to the methods of the invention in which a heated aqueous oxidizing solution is mixed with a heated slurry of loaded oxides of manganese to form a mixture or a heated aqueous oxidizing solution to which loaded oxides of manganese are added to from a slurry mixture, the mixtures being adjusted and maintained so as to be within the $MnO_2$ stability area.

"Pretreated oxides of manganese," as used herein, refers to virgin or unreacted oxides of manganese that have been processed according to the methods of the invention in which a heated aqueous oxidizing solution is mixed with a heated a slurry of virgin oxides of manganese to form a mixture or a heated aqueous oxidizing solution to which virgin oxides of manganese are added to from a slurry mixture, the mixtures being adjusted and maintained so as to be within the $MnO_2$ stability area.

"Precipitated oxides of manganese" as used herein, refers to oxides of manganese formed or newly formed by precipitation from a mixture of a heated manganese salt solution and a heated aqueous oxidizing solution or a mixture formed by addition of manganese salts to a heated aqueous oxidizing solution, the mixtures being adjusted and maintained so as to be within the $MnO_2$ stability area.

"Manganese containing solution" as used herein, refers to a manganese containing solution selected from the group consisting of a slurry of virgin oxides of manganese, a regeneration slurry containing rinsed reacted oxides of manganese, a slurry of loaded oxides of manganese containing disassociated manganese cations, and a manganese salt solution containing disassociated manganese cations.

"Aqueous oxidizing solutions" as used herein refers to an aqueous solution containing an oxidant or oxidizer. The aqueous oxidizing solution may contain be a premixed solution containing both oxidant and base.

"Combined mixed process solution" as used herein, refers to a mixture of manganese containing solution and an aqueous oxidizing solutions.

The methods and systems of the invention, whether for regeneration, pretreatment or precipitation, each involve and employ Applicants' recognition that oxides of manganese processed in an aqueous continuous flow reactor system in which conditions and parameters such as but not limited to: temperature, pressure, pH, Eh, molar concentration of the constituents (molarity), and retention times are initially prepared to be in the permanganate stability area or $MnO_2$ stability area and thereafter adjusted and maintained within the $MnO_2$ stability area will yield oxides of manganese having high pollutant loading capacities and/or high oxidation states. In its various embodiments, the invention and the methods and systems thereof provide for rapid, adaptive and stable processing in a continuous flow reactor of oxides of manganese as compared to the methods and systems currently know in the art. Oxides of manganese thus processed are suitable for use as a sorbent in dry and wet gaseous pollutant removal systems and are particularly suitable for use in dry pollutant removal systems. They may also be utilized in a variety of commercial, industrial and other applications, unrelated to pollutant removal, that incorporate or employ oxides of manganese.

Without being bound by theory, Applicants believe that the processing of loaded and virgin oxides of manganese and the precipitation of newly formed oxides of manganese according to the invention in a heated aqueous oxidizing solution within a continuous flow reactor system maintained within the $MnO_2$ stability area may beneficially affect a number of characteristics of the oxides of manganese. Such characteristics include, but are not limited to, particle size and shape, crystalline structure or morphology, pore volume, porosity, composition, surface area (BET), bulk density, electrochemical or oxidation potential and/or manganese valence states. Some or all of these characteristics affect the performance of oxides of manganese in their various uses and, particularly, in their use as a sorbent for removal of gaseous pollutants. With attention to the maintaining the continuous flow reactors aqueous system conditions within the $MnO_2$ stability area, Applicants have found that they are able to produce oxides of manganese having desirably high loading capacities and/or high valence states.

Applicants have found that oxides of manganese can also be processed in the methods of the invention by first preparing the an aqueous oxidizing solution that is Eh and pH that is either in the permanganate stability area or that moves the solution initially into the permanganate stability area when contacted with a manganese containing solution under process temperatures and pressures. After mixing of the two solutions, the pH of combined mixed process solution is allowed to drop from alkaline down into the acidic range, moving the solution into the $MnO_2$ stability area. This technique can be employed in the various embodiments of the invention to produce processed oxides of manganese useful, amongst other applications, as a sorbent for removing target pollutants from gas streams. The permanganate stability area of the Pourbaix diagram is above that of the $MnO_2$ stability area and has a higher Eh level. The process solution will develop the purple permanganate color and when, during the process, the pH drops moving the solution to enter into the $MnO_2$ stability window, will start precipitating $MnO_2$ sorbent. This is highly beneficial in precipitation methods as this avoids formation of lower valence state oxides of manganese that have to be oxidized up to $MnO_2$. and depletion on consumption of oxidant; and therefore, less oxidant can be used.

This process can be used to make pretreat virgin sorbent and to regenerate reacted sorbent and yields processed oxides of manganese with increased loading capacity and/or oxidation strength.

The $MnO_2$ stability area for an aqueous system varies based upon the conditions of the system and may shift or drift as reactions in the aqueous system proceed. For example, changes in dissolved manganese ion concentration, oxidizer concentration, pH, Eh, solution temperature and pressure, and competing dissolved ions may affect the boundaries of the domain or region of stability for $MnO_2$. The aqueous oxidizing solution within the continuous flow reactor system of the invention are typically at temperatures at or greater than 100° C. and at atmospheric pressures at or greater than ambient The effects of such changes or different conditions upon the boundaries of the $MnO_2$ stability area on a Pourbaix Eh-pH diagram can be determined either by empirical data derived from experimentation or generated from theoretical calculations which can be carried out manually or with computer software programs known to those skilled in the art, such as HSC Chemistry distributed by Outokumpu Oy of Finland or OLI Systems, Inc. of New Jersey, USA. Software may also be written to determine the $MnO_2$ stability area as defined by other diagrams, such as the Latimer Diagram or the Frost Diagram.

Figure 2:
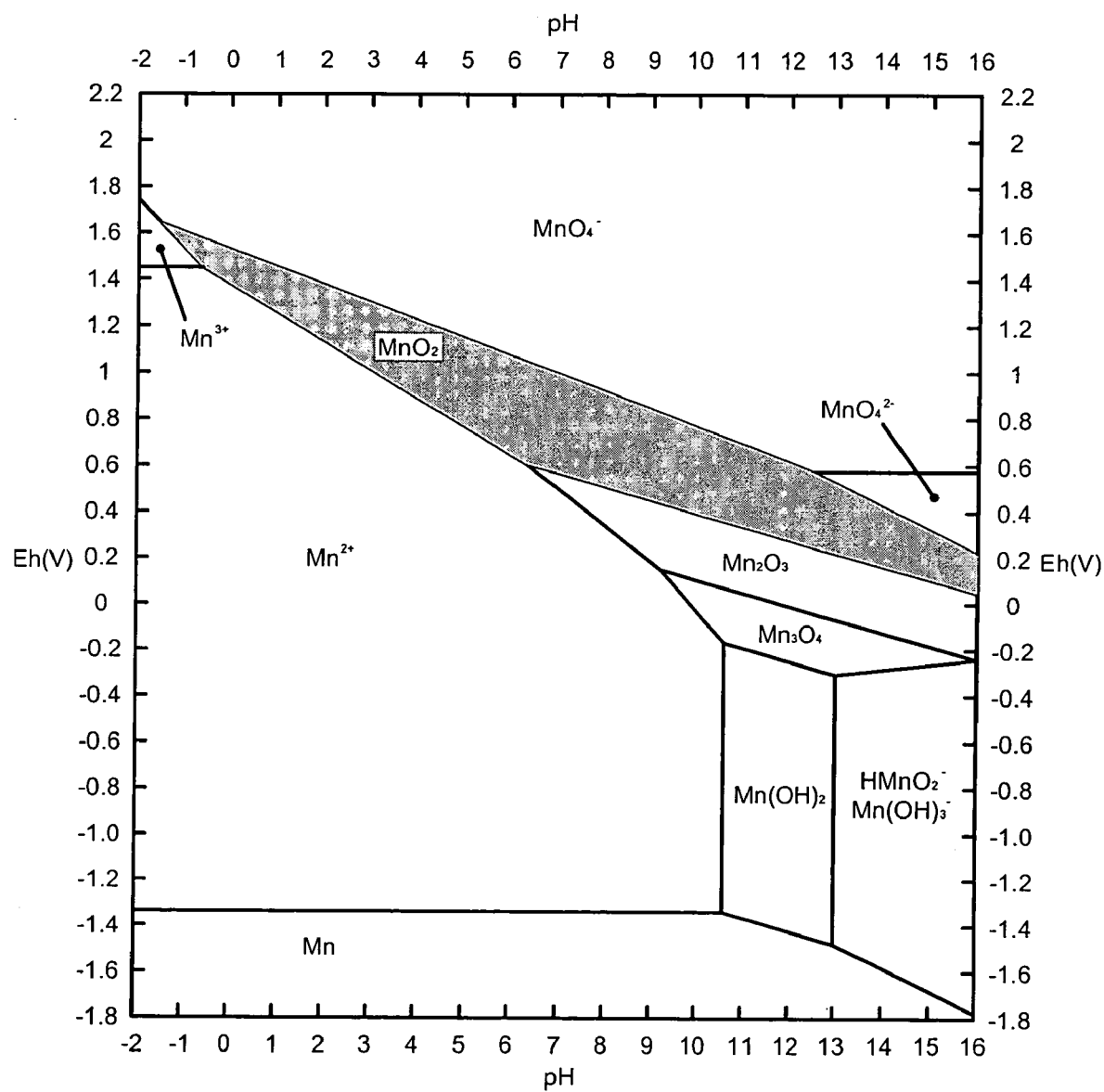
FIG. 2 is a Pourbaix diagram for an aqueous solution of 10-6 mole/liter manganese ion concentration.

With reference to FIGS. 1 and 2, impact of system conditions on the $MnO_2$ stability area is illustrated with respect to Pourbaix Diagrams for aqueous systems at 25° C. and at ambient pressure at sea level. In FIG. 1, the ranges of pH and Eh-values for thermodynamically stable aqueous solution systems of various manganese compounds are illustrated in graph form for aqueous solution systems at 25° C. and a 1 mole/liter manganese ion concentration. FIG. 2 similarly illustrates ranges of pH and Eh values for an aqueous solution system at 25° C. but at a 1.0×10-6 mole/liter manganese ion concentration and ambient pressure at sea level. The Pourbaix Diagrams depicted in FIGS. 1 and 2 were derived from the diagram presented in Atlas of Electrochemical Equilibria in Aqueous Solutions," Marcel Pourbaix, pages 286-293, National Association of Corrosion Engineers, Houston, Tex. A comparison of the boundaries of the two shaded areas on FIGS. 1 and 2 is illustrative of the different stability areas that exist under different system conditions. The Pourbaix Diagrams of FIGS. 1 and 2 are provided by way of illustration. It should be understood that such diagrams would be different at different temperatures, pressures and molarities and are not intended to represent a diagram reflecting process conditions within a continuous flow reactor operated in the methods of the invention. In fact the methods of the invention can be carried out at ambient temperatures and pressures as well as at elevated temperatures and at pressures above atmospheric.

In the methods and systems disclosed herein, the conditions or parameters of aqueous solution systems within a continuous flow reactor are maintained within the $MnO_2$ stability area with regard to electrochemical (oxidizing) potential (Eh) range and pH range at the prescribed system molarity, temperature and pressure in order to provide an Eh-pH combination to achieve stable solution equilibrium, as defined by the $MnO_2$ stability area as delineated in, for example a Pourbaix Diagram, such as those depicted in FIGS. 1 and 2.

In a Pourbaix Diagram, the $MnO_2$ stability area is defined by the thermodynamically stable ranges or boundaries of pH-Eh combinations at a given manganese ion concentration, oxidant concentration, solution temperature and pressure, and dissolved ions that promote the existence and formation of $MnO_2$ (Mn having average valence state close to +4) as the most thermodynamically stable form of manganese in an aqueous solution system. In the methods of the invention, the constituents of the aqueous solution within the continuous flow reactor are the loaded or virgin oxides of manganese or the disassociated manganese salts along with the oxidizer or oxidizers in the aqueous oxidizing solution and the base or acids that may be added thereto. During processing, the aqueous solution within the continuous flow reactor system must be moved to and maintained at or within the boundary area delineated by the combination of Eh and pH ranges. In order to accomplish this, temperature, pressure, molarity, Eh, and/or pH adjustments must be made through the addition of oxidizer, base, acid or manganese and other ions.

To this end, Applicants typically utilize a preheated aqueous oxidizing solution containing an oxidizer also referred to interchangeably herein as an oxidant. The oxidizer must be able to provide the required electrochemical (oxidizing) potential (Eh) at the specified temperature, pressure and molarity and within the specified ph ranges to provide an Eh-pH combination to achieve stable aqueous solution system equilibrium within the permanganate or $MnO_2$ stability area. Suitable oxidizers to name a few include, but are not limited to, persulfates, such as potassium peroxidisulfate ($K_2S_2O_8$), sodium peroxidisulfate ($Na_2S_2O_8$), and ammonia peroxidisulfate (($NH_4)_2S_2O_8$), chlorates, such as sodium chlorate ($NaClO_3$), perchlorates such as sodium perchlorate (NaClO4), permanganates, such as potassium permanganate ($KMnO_4$), oxygen ($O_2$) or air, ozone ($O_3$), peroxides, such. as $H_2O_2$, organic oxidizers, such as peroxyacetic acid ($C_2H_4O_3$), and hypochlorites, such as sodium hypochlorite (NaOCl). Other oxidizers suitable for use in the methods of the invention will be apparent to those skilled in the art; it being understood that the electrochemical potential (Eh) of the preheated aqueous oxidizing solution, and therefore the effectiveness of the methods of the invention, depends, in part, upon the strength of the oxidizer and/or the concentration of the oxidizer in the solution. The oxidant may also be produced in and fed from an electrolytic cell.

Depending upon the conditions and constituents of the aqueous solution within the continuous flow reactor system, the pH range of the boundary may be acidic, near neutral, or basic. In short, processing may be carried out over the full pH spectrum. However, the oxidizer strength or concentrations required at the extremes of the pH spectrum may make such processing uneconomic though nonetheless achievable. As the reactions proceed, $MnO_2$ is being produced and the oxidizer is being consumed, the system may tend to shift away from the desired pH range, in which case the addition of a suitable base or acid will help accomplish the necessary adjustment to maintain the aqueous solution within the continuous flow reactor system within the appropriate Eh-pH range of the $MnO_2$ stability area may be required.

Continuous flow reactors are known in the art and may be provide in various configurations and may be equipped with a number of components and utilized in the methods and systems of the invention. As shown in the figures a continuous flow reactor is show as a section of serpentine pipe and provided with an orifice 92, a static mixer 25 and a back pressure valve 96. It should be understood that the continuous flow reactors may be also be provided with a plurality of ports for introduction or injection of solutions for making adjustments in combined mixed process solution conditions at different locations along the lengths of pipe forming the continuous flow reactors. For example, a port 96 is shown in FIGS. 3-10, as an oxidant/base/acid addition. A plurality of ports 96 may be provide for addition of these and other constituents or for purging of process solutions form continuous flow reactors.

Continuous flow reactors may be a single length of pipe, engths of pipe with pipe "branches" or interconnected connected lengths of pipe equipped with diverter valves to direct the flow of process solutions. The branched pipe or interconnected lengths of pipe may be of different lengths allowing for process solutions to be directed from a main pipe length to longer or short pipe lengths when system parameters indicate that either longer or short processing residence times are required. Such configurations are one of several ways that residence time can be regulated or controlled in the systems and methods of the invention. It should be therefore be understood that the continuous flow reactor depicted in Figures is being provided sole for illustrative purposes.

Applicants have found it beneficial to maintain pH relatively constant during processing. Alternatively, the introduction of additional oxidizer to bring the system within the appropriate Eh range as pH drifts or shifts in the aqueous system may also beneficially accomplish the necessary adjustment. The aqueous solution within the continuous flow reactor system is, and therefore the methods and systems of the invention are, dynamic and adaptive with necessary adjustments being made not only by introduction of acid or base but with introduction of oxidizer along with changes in temperature, molarity and pressure within the continuous flow reactor.

Examples of useful bases include but are not limited to alkali or ammonium hydroxides, potassium hydroxides, and sodium hydroxides. Examples of useful acids include but are not limited to sulfuric, nitric, hydrochloric and perchloric acid to name a few. Applicants have found it useful to match the cations of the oxidant and base. For example, where the oxidant is a persulfate, such as potassium peroxidisulfate ($K_2S_2O_8$), the pH could be adjusted with a compatible or suitable base, such as potassium hydroxide (KOH). If sodium peroxidisulfate is used ($Na_2S_2O_8$), a compatible base would be sodium hydroxide (NaOH); and with ammonium peroxidisulfate (($NH_4)_2S_2O_8$), ammonium hydroxide (($NH_4OH$) would be a compatible base. The acids or bases and other process additives are generally commercially available and those skilled in the art would be able to readily identify compatible process additives useful within the scope of the invention.

As previously noted, oxidant may be provided in an aqueous oxidizing solution containing only an oxidant with base being separately provide. However, Applicants have found it useful to utilize an aqueous oxidizing solution created by premixing the oxidant and base solutions in specific quantities thereby created a premixed solution of oxidant and base oxidizing solution termed "premixed oxidant/base solution". This premixed oxidant/base solution is prepared with the desired pH-Eh combination and can be prepared, maintained, or adjusted by increasing or decreasing the amounts or molarity of oxidant, acid, base, constituent concentrations, temperature, and/or pressure adjustment, as appropriate, so that the conditions are adjusted to remain within the $MnO_2$ stability area when the aqueous oxidizing solution is contacted with the manganese containing solution Through their understanding of the relationships between the system parameters of the $MnO_2$ stability area and application thereof to conditions of a given aqueous system within a continuous flow reactor, Applicants are able to achieve stable and controlled regeneration, pretreatment, and precipitation so as to rapidly and adaptively yield oxides of manganese having equal or increased loading capacity when compared to the untreated commercially available EMD and CMD oxides of manganese (NMD, EMD, and CMD) or when compared to loaded oxides of manganese. At a given pH, Eh and temperature, pressure, and molar ranges within the $MnO_2$ stability area, the desired manganese valence state (theoretically close to +4) will exist. Thus, there is no propensity for Mn compounds at or close to +4 valence state to degrade to +3 or +2 valence states. However, if conditions are not maintained within the $MnO_2$ stability area such degradation may occur.

Applicants have found that oxides of manganese regenerated or pretreated in or precipitated (newly formed) within a continuous flow reactor from an aqueous oxidizing solution that is contacted or mixed with a manganese containing solution and subsequently that are maintained within the $MnO_2$ stability area will exhibit a Mn valence state of close to +4 and exhibit target pollutant loading capacities equal to and/or greater than (increased) the loading capacities of virgin or loaded oxides of manganese.

As further discussed below, aqueous oxidizing solutions can be preheated solutions containing oxidants or preheated premixed oxidant/base solutions, having the desired pH, Eh, temperature, pressure, and molar concentration combinations can be prepared and maintained or adjusted by increasing or decreasing oxidizer, acid or base concentrations, and/or temperature and pressure adjustment, as well as molar concentration adjustment as appropriate, so that the conditions are adjusted to remain within the $MnO_2$ stability area Though preheating is a desirable and sometime required step, it may not be required for aqueous solution systems processed in a continuous flow reactor according to the methods of the invention. With monitoring of Eh, pH, temperature, pressure, and molar concentrations an operator can make necessary adjustments in order to maintain or return the process solution conditions in a continuous flow reactor to within the $MnO_2$ stability area. Such monitoring and adjusting can also be automated utilizing electronic probes or sensors and controllers as discussed later herein below.

In the various embodiments of the invention disclosed herein, the systems in which the methods of the invention are carried out all have common or corresponding components that are substantially the same. Though referred to, in appropriate instances by slightly different terms (for purposes of clarity) and being identified with corresponding but different reference numbers in the figures and the disclosure herein below, their operation and function will also be understood to be substantially the same and equivalent. To the extent that there are operational or functional differences, they are identified and discussed as appropriate. Common system components include continuous flow reactor in which regeneration, pretreatment and precipitation are carried out; agitation devices such as static mixers and probes for temperature, pressure, Eh, pH, and TDS (total dissolved solids) measurement with which the continuous flow reactor and other system components may be equipped. The continuous flow reactor are also equipped with a heating unit, such as a heater or heat exchanger (not shown in the figure hereof) for adding heat to and maintaining the temperature of the solutions in the vessels.

Sorbent may be introduced into pollutant removal systems as wet filter cakes, or slurry without drying using different types of spray, injector, slurry or filter cake feeders. Drying is not required for all applications. For applications requiring dried oxides of manganese, a dryer would be another common component. And, for applications requiring the oxides of manganese to be comminuted and sized, a comminuting device would be another common component. These components are further discussed herein below. It should be understood that discussion of common components in the first instance with respect to one embodiment of the invention is equally applicable and relevant to the components as incorporated into the other embodiments of the invention. Therefore, in the interest of efficiency and to avoid undue repetition, the discussion of the components may not be serially repeated in detail.

As noted earlier herein, Applicants believe that reaction products, such as manganese salts, form on the particle surfaces of the oxides of manganese sorbent in the process of removing target pollutants in pollution control systems. Such reaction products, include for example, $MnSO_4$, $Mn(NO_3)_2$, $MnCl_2$ and other manganese salts and the like. It is further believed that formation of such salts or other reaction products occurs primarily, but not exclusively, on the surfaces of the oxides of manganese sorbent particles. These salts or reaction products form a layer or coating, which effectively isolates the unreacted portion of sorbent particles under a coating of reaction products, thereby preventing continued rapid reaction with additional target pollutant gas molecules at such sites. This formation of reaction products on the sorbent particle surfaces results in a loaded or partially loaded condition which over the course of target pollutant removal processing eventually diminishes the ability of the oxides of manganese to capture additional target pollutant gas molecules or to capture target pollutants at a desired level of removal efficiency.

With processing according to the invention, the reacted or loaded oxides of manganese sorbent can be regenerated and made available for subsequent pollutant removal cycles or for use in other industrial or commercial applications. Additionally, as discussed later herein below, valuable byproducts may also be recovered from process stream of the invention.

When regenerating oxides of manganese with the methods of the invention, reacted sorbent is processed in a preheated premixed oxidant/base aqueous solution within the continuous flow reactor under controlled conditions, specifically within the $MnO_2$ stability area, to produce regenerated oxides of manganese. The regeneration methods of the invention can be understood with reference to FIGS. 3-5 which depicts different possible embodiments of a regeneration system 10 of the invention in block flow.

Figure 3:
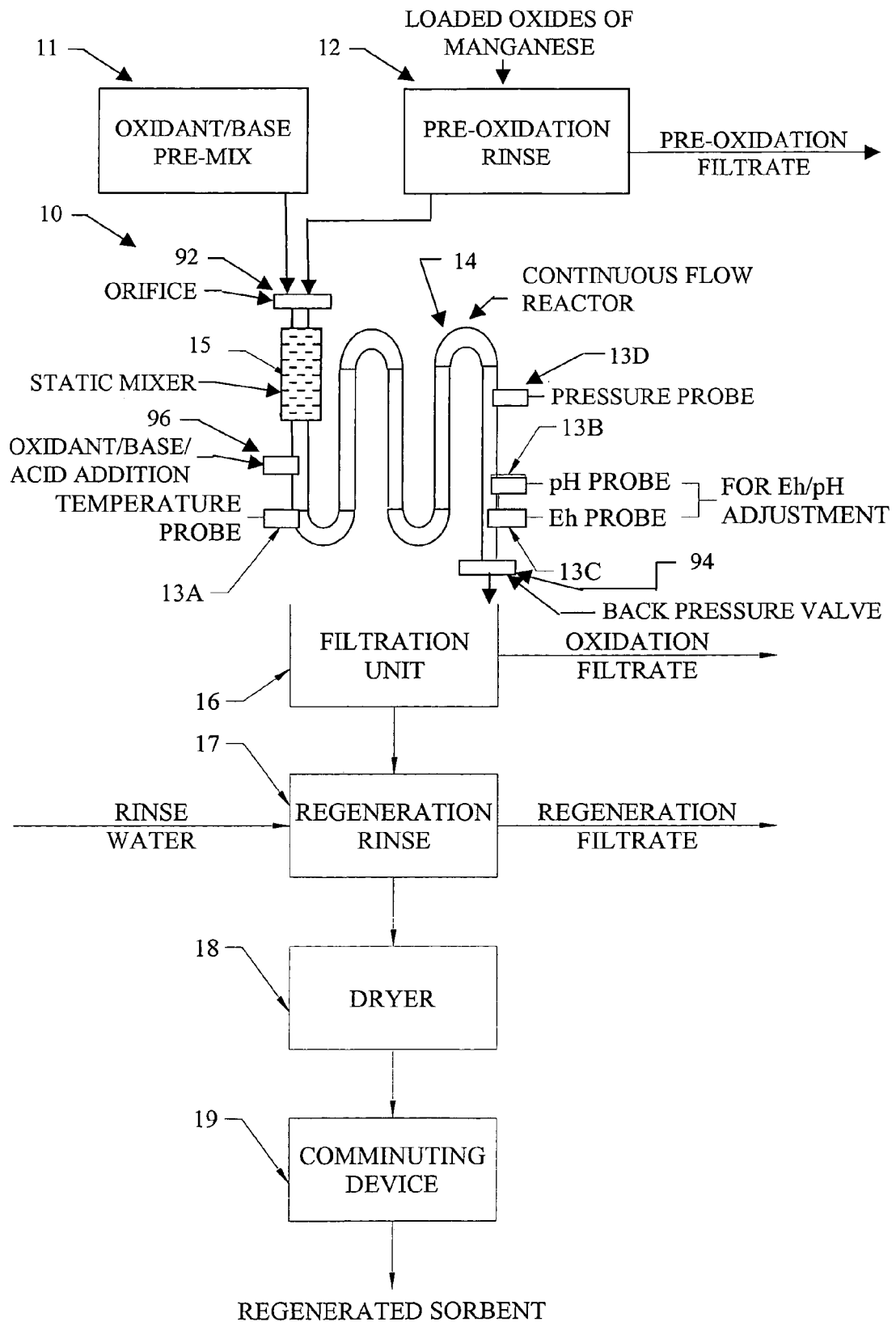
FIG. 3 is a block flow diagram of a system and process according to the invention.
Figure 4:
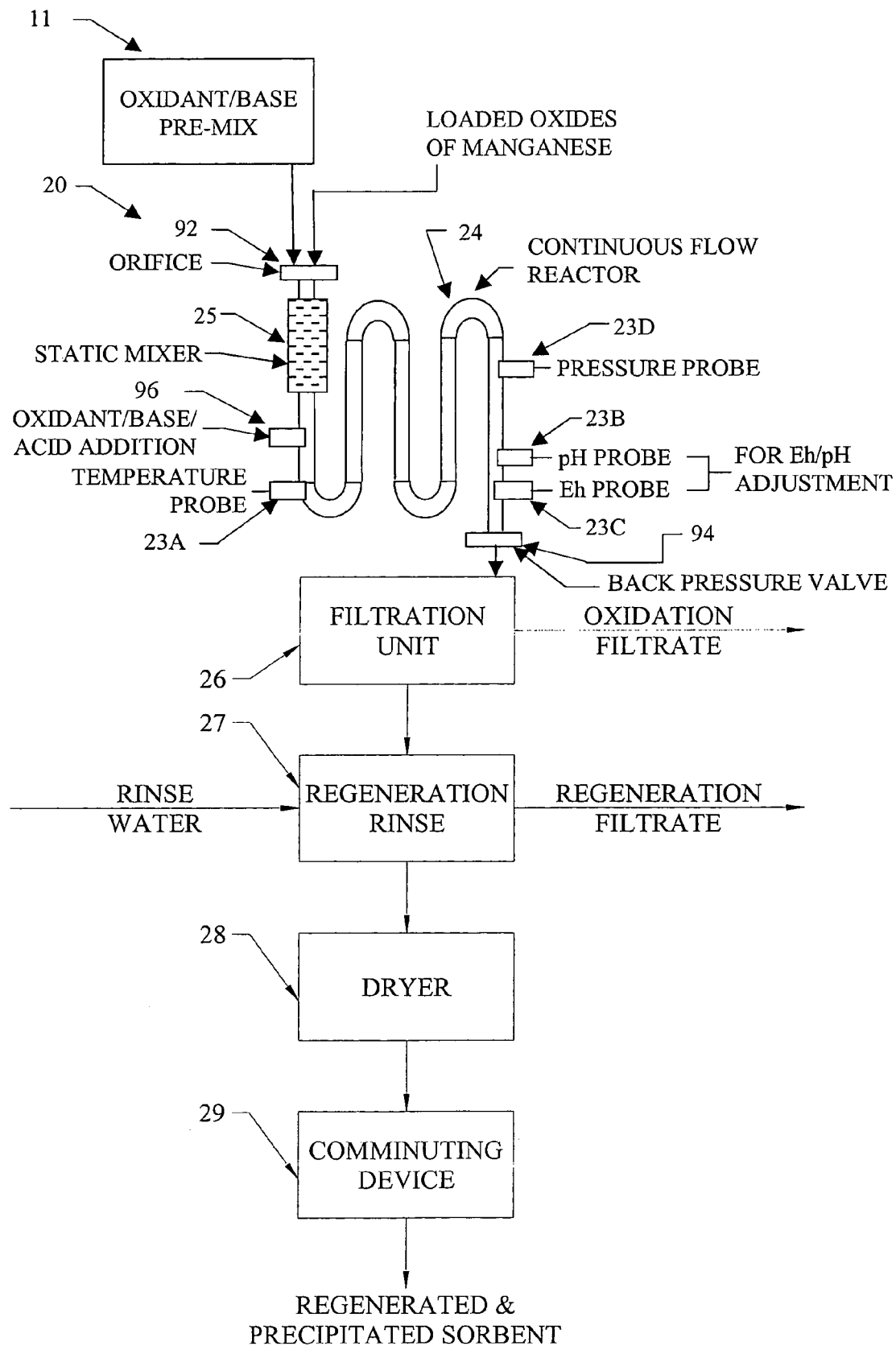
FIG. 4 is a block flow diagram of a system and process according to the invention.
Figure 5:
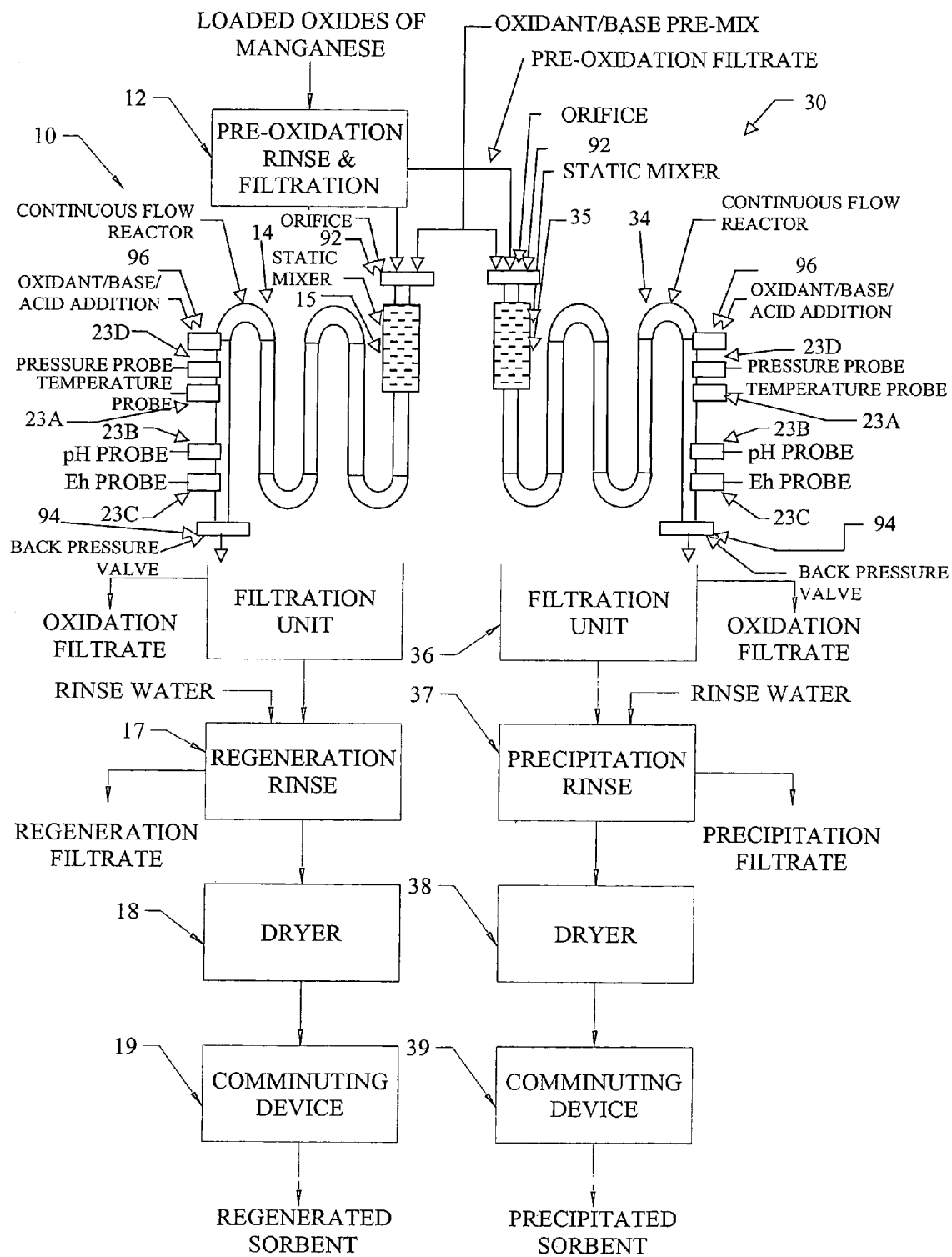
FIG. 5 is a block flow diagram of a system and process according to the invention.

Turning to FIG. 3, oaded oxides of manganese or loaded sorbent is rinsed or washed with an aqueous solution in the pre-oxidation sorbent rinse 12 of regeneration system 10 (without the precipitation subsystem 30 shown in FIG. 5). The rinse step serves to wash away reaction products from the surface of reacted oxides of manganese sorbent particles along with impurities and very fine particulate matter. Regeneration, however, may be conducted without the rinse step as discussed with reference to FIG. 4 herein below. Following rinsing, the rinsed sorbent is separated from the rinse solution to provide rinsed sorbent or rinsed oxides of manganese or sorbent and a pre-oxidation filtrate.

Filtration may be carried out using any of a variety of suitable filtration techniques and devices known to those skilled in the art. A separate filtration device may be used following pre-oxidation rinse 12 or the filtration device may be incorporated in and part of pre-oxidation rinse 12. The filtrate will contain recoverable values, such as cations and anions from disassociated reaction products. For example, where the reaction products are manganese salts, such as manganese sulfate ($MnSO_4$) and manganese nitrate ($Mn(NO_3)_2$),: $Mn^{+2}$, $SO_4^{-2}$, $NO_3^{-1}$, spectator ions, suspended solids or other particulates. As discussed later herein below with reference to FIGS. 5, 8 and 10 these values can be recovered from the pre-oxidation filtrate through oxidation and precipitation of the $Mn^{+2}$ ion as a solid precipitated oxides of manganese; and with further processing the sulfate or nitrate anions can be recovered and formed into useful and marketable by-products, e.g., fertilizers, chemicals or explosive products or routed for disposal as required.

After rinsing and separation, an appropriate quantity of water is added to the rinsed sorbent to create a rinsed sorbent slurry capable of being pumped and introduced or conveyed to continuous flow reactor 14 which is equipped with at least agitation and mixing device 15, shown as static mixer 15 in FIG. 3. Any of various static mixing or agitation devices known to those skilled in the art to be suitable for mixing solutions or solid-liquid slurries so as to keep the solid oxides of manganese particles generally suspended in solution as they move down continuous flow reactor 14 can be utilized.

As illustrated in FIG. 3, the continuous flow reactor 14 is equipped with temperature, probe 13A, pH probe 13B, Eh probe 13C and pressure probe 13D. These probes are utilized to measure their respective parameters in the solutions or slurries processed in continuous flow reactor 14 and may be in electronic communication with a controller as later discussed herein with reference to FIG. 8.

Continuous flow reactor 14 is depicted in FIG. 3 with a single static mixer 15 and a single orifice 92. It should be understood that continuous flow reactors may be provided with a plurality (two or more) of agitation and mixing devices and orifices to assure proper and continuous mixing and/or to allow introduction of additional amounts of premixed oxidant/base solution and rinsed sorbent slurry as needed. The premixed oxidant/base solution and rinsed sorbent slurry may be separately introduced or introduced after prior mixing of the two at different points along the continuous flow reactor 14. The rinsed sorbent slurry is mixed with a preheated premixed oxidant/base aqueous solution from oxidant/base premix vessel 11 to form a slurry, referred to herein as the regeneration slurry. The two process streams, the rinsed sorbent slurry and the premixed oxidant/base solution, are both metered into the continuous flow reactor separately or as a regeneration slurry, and depending upon configuration or process design may first enter through orifice 92. Orifice 92 provides a pressure drop in the system which aids in the creation of oxides of manganese particle characteristics useful in target pollutant capture. The resulting mixture or regeneration slurry is monitored and/or adjusted, as necessary, by addition of oxidant, acid, or base concentrations, with temperature, and/or pressure adjustment, as appropriate, so that the conditions are adjusted to remain within the $MnO_2$ stability area.

Prior to introduction into the continuous flow reactor, both the premixed oxidant/base aqueous solution and the rinsed sorbent slurry may be preheated. For example for some applications, the solution and slurry may be preheated to temperatures above ambient. For other applications they may be preheated to temperatures that are at least at or near 100° C. or to such higher temperature as appropriate as the oxidant can tolerate without decomposing. Within the limits of oxidant decomposition sensitivity, the aqueous oxidizing solution can be preheated to temperatures approaching processing temperatures at given operating pressures within continuous flow reactor and as required to be within the $MnO_2$ stability area. In this and all other embodiments of the Applicants' invention, the two solutions can alternately be heated to temperatures in excess of 100° C. before being brought into contact. However, certain oxidants used in the Applicants' invention tend to decompose at temperatures in excess of 100° C., thereby causing the undesirable occurrence of oxidant decomposition prior to the sought after reaction with manganese ions. However, certain other oxidants are useful at temperatures in excess of 100° C. The manganese containing solution, the rinsed sorbent slurry, and the aqueous oxidizing solution, the premixed oxidant/base solution may be introduce without heating and heated as they enter continuous flow reactor 14 by a heating unit incorporated into continuous flow reactor 14. Further, for those oxidants sensitive to elevated temperatures, once the aqueous oxidizing solution contacts and is mixed with the manganese containing solution to form the combined mixed process solution, reactions in the continuous flow reactor have begun. Once reactions have begun, temperatures can be elevated above the temperature at which the oxidant would decompose as this may facility or accelerate process chemistry.

Just as temperatures may be elevated within the continuous flow reactors in the methods of the invention, pressures may also be elevated above atmospheric conditions. Back pressure valvesSimilarly, pressures may be above atmospher Regeneration of the rinsed slurry may be carried out at temperatures required in order to maintain the aqueous solution system with the $MnO_2$ stability area as other system parameters shift during processing. Applicants have found that processing temperatures in excess of 100° C. may be utilized in processing oxides of manganese sorbent within the continuous flow reactor, as long as solutions and slurries are maintained within the $MnO_2$ stability window. There may be heating units, such as heat exchangers or other devises known to those skilled in the art of heating solutions, at different points along various lengths of a continuous flow reactor.

Determining which parameter adjustments to make is a matter of engineering or operator choice as long as the adjustment moves system conditions into or maintains them within the $MnO_2$ stability area.

The preheated aqueous premixed oxidizing/base solution provides the required electrochemical (oxidizing) potential (Eh), within the specified temperature, pressure, and pH range to yield regenerated oxides of manganese having high loading capacities and/or high oxidations states. Through use of static mixers, the regeneration slurry in continuous flow reactor 14 is continuously mixed and the pH of the slurry is adjusted by appropriate means, e.g., addition of acid or base.

The regeneration slurry of oxides of manganese are allowed to remain within the continuous flow reactor for a time sufficient to achieve an increased oxidation state and/or a target pollution loading capacity equal or greater than that of virgin oxides of manganese sorbent originally utilized to capture target pollutants. Applicants have found that oxidation strength and/or load capacity of the $MnO_2$ tends to increase with an optimum retention time determined for a specific temperature, pressure, pH, Eh, and molar concentrations as does the production of $MnO_2$. With sufficient retention time substantially all of the oxides of manganese contained in the regeneration slurry will be regenerated, until the aqueous solution will contain substantially only $MnO_2$ and useful by-products, such as potassium or sodium nitrates or sulfates for example, left in solution before exiting the continuous flow reactor.

Retention times can be increased to the desired duration by adding to or routing the combined mixed process solution through additional pipe lengths of a continuous flow reactor, changing the pipe diameter, slowing down the injection rate of the solutions, changing concentrations of process solution constituents or by other means known to those skilled in the art of continuous flow reactor design and operation. If monitoring indicates that processing is complete, the combined mixed process solution can be purged from continuous flow reactor 14. Continuous flow reactors may be provided with multiple flushing ports, (not shown) for this purpose or to vacate the process solution for any reason or for general routine maintenance and cleaning of a section of pipe forming a continuous flow reactor.

Retention times may also be regulated or controlled by changing input molarities or concentrations of chemical constituents. Adjusting the amounts of manganese, whether in a slurry or disassociated in solution, or the amounts of oxidant can vary required processing time and thus retention time. For example, if the manganese containing solution has high concentrations of manganese values, the amount of oxidant may be increased thereby reducing the retention time. Similarly, if a slower processing time is desired the amount of oxidant may be decreased, but preferably not be low a concentration need to complete processing of manganese values to $MnO_2$.

Applicants have found that with an optimal regeneration slurry retention time the portions of the solid rinsed oxides of manganese particles that have had their reactivity or target pollutant loading capacity reduced, through lowering of valance state, are oxidized up to valance states close to +4.

At the end of the continuous flow reactor is a backpressure valve 94 or other devise known in the art, which controls the pressure within the continuous flow reactor. Just as temperatures may be elevated within a continuous flow reactor, pressure may also elevated in excess of atmospheric pressure is monitored, regulated and controlled to desired processing pressure and adjusted according to process dynamics. Valve 94 in conjunction with heating units allows the temperature and pressure to be raised and maintained within the pipe to the appropriate processing temperature and pressure as defined by the $MnO_2$ stability window. The regeneration slurry exiting backpressure valve 94 or similar device or from flushing points is routed to a wash and rinse process where the $MnO_2$ sorbent is separated and filtered from the solution leaving a filtrate and regenerated oxides of manganese filter cake. Filtration can be preformed by techniques known to one skilled in the art of filtration, such as but not limited to hydroclones, drum filter, moving bed filter, or a filter press.

Separation of the regenerated oxides of manganese and the oxidation filtrate may be performed at a minimal temperature preferably close to about 100° C., and more preferably close to the operating temperature in continuous flow reactor 14. This separation may less preferably be performed at temperatures below the minimal temperature. Allowing the solution containing regenerated oxides of manganese and the aqueous oxidizing solution to cool to temperatures below the solubility temperatures for residual or spectator ions in solution, for example, but not limited to $K^{+1}$ and $SO_4^{-2}$ can result in the precipitation of solid salts such as $K_2SO_4$. So as a practical matter, temperature above the solubility temperature of residual ions may be the minimal desirable temperature. Through experimentation, it has been recorded that allowing salts to precipitate with the regenerated oxides of manganese sorbent lowers the target removal efficiency and loading rates and should therefore be avoided. The separated regenerated sorbent or regenerated oxides of manganese are then further rinsed with water to wash away any remaining spectator ions.

In FIG. 3, this is illustrated as two separate steps: 1) filtering and separating the regenerated oxides of manganese from the regeneration slurry in filtration unit 16 to provide an oxidation filtrate; and 2) rinsing the separated, regenerated sorbent with water to wash away remaining spectator ions in the regeneration rinse 17.

Any of a variety of suitable filtration techniques and devices known to those skilled in the art may be utilized for this purpose. It should be noted that the filtration and rinsing step could be carried out in combined filtration and rinsing equipment known to those skilled in the art. Further, as with the pre-oxidation rinse, the filtration unit 16 may alternatively be incorporated into and as an integral part of continuous flow reactor 14. The rinsing of the regenerated oxides of manganese should be of sufficient duration and with sufficient volume of water as to remove disassociated ions associated with the oxidizer, base, and acid in the aqueous oxidizing solution to a suitable level. The presence of these ions in the regenerated sorbent in excessive amounts may negatively impact the loading capacity or removal efficiency of the regenerated oxides of manganese. This is not to say that regenerated oxides of manganese that are not so rinsed will be ineffective for removal of target pollutants because in fact they may be so utilized without the rinse or with less than thorough rinsing and good removal rates can be achieved. However, the regenerated oxides of manganese may be more efficiently utilized following rinsing. This is equally applicable to oxides of manganese pretreated or precipitated according to the methods of the invention.

Various measurement techniques and devices known to those skilled in the art can be employed to determine the level or concentration of such ions in rinse water and thereby determine whether the oxides of manganese have been adequately rinsed. Such techniques include measurement of conductivity, resistivity, total dissolve solids (TDS) or other indicators of the level of disassociated ions and/or dissolved solids and fine particulates in a solution, such as specific gravity or density or chemical analysis. By way of example and not limitation, TDS measurements of the oxidation filtrate taken by Applicants have been in the range of 80,000-200,000, representing the disassociated ions from the oxidant, base or acid and other possible dissolved solids or fine particulates associated with the regeneration. The rinse step should generally being designed to remove such ions, solids and particulates from the regenerated oxides of manganese to an acceptable level or tolerance. Where precision is required the vessel or apparatus in which the rinse and/or filtration is carried out should be equipped with an appropriate probe for monitoring or measuring conductivity, resistivity, TDS level or other indicator of the mount of dissolved solids and particulates in solution which may generally be referred to as a TDS probe and coupled with or part of a TDS controller or TDS control element. The TDS controller in response to an input from the TDS probe can regulate or control the level or duration of the rinse and/or filtration step by signaling the termination of the rinse and/or filtration step once the desired TDS set point has been reached.

Continuous flow reactors may also optionally be provided with TDS probes in electronic communication with controller 67 or a TDS controllers. TDS levels are an indicator or the concentration of manganese and other ions in the process solution in the continuous flow reactor. TDS level data allows a controller, such as controller 67, to calculate manganese ion molarity and determine the required Eh and pH at process temperatures and pressures required to precipitate oxide of manganese. Phrased alternatively, TDS level data can help determine the $MnO_2$ stability are for given conditions in the process solution in a continuous flow reactor or the required Eh and pH level of the aqueous oxidizing solution to be mixed with a manganese containing solution.

With monitoring of such measurements, the rinse step can be carried out until the oxidation filtrate reaches the desired level based upon the measurement technique employed. Through a series of regeneration cycles and loading cycles, the acceptable level or tolerance for the given use to which the regenerated oxide will be put can be determined, as well as the volume, flow rate and duration of the rinse in order to establish or standardize operating procedures. Although lowering the TDS of the filtrate generally favorably impacts target pollutant removal efficiency and loading rates, Applicants have found that oxides of manganese prepared according to the methods of the invention may be utilized for target pollutant removal with or without the rinsing step. Applicants have achieved adequate target pollutant removal with regenerated oxides of manganese that is not rinsed prior to use as a sorbent, but have seen better removal at measured TDS levels in the filtrate of less than 100,000 and even better performance at less than 10,000.

Returning to FIG. 3, the wet regenerated oxides of manganese, if being utilized in a dry target pollutant removal system such as the Pahlman™ system, is first routed for drying to a dryer 18, referred to as sorbent dryer 18 in the figure. Oxides of manganese may be introduced into pollution removal systems as a dry powder, a wet filter cake, or slurry by a slurry or spray feeder. In dry removal systems, the wet filter cake and sprayed slurry may be "flash dried" upon contact with industrial gas streams which may be introduced at elevated temperatures into the pollutant removal systems. For such applications the drying step may not be necessary and the wet or moist filter cake may be conveyed to a filter cake feeder. Similarly, with injection, slurry, spray or spray injection feeders, once adequately rinsed, the regenerated oxides of manganese need not be further filtered or separated. With addition of such amount of water as necessary, a sorbent slurry may be formed. The sorbent can then be conveyed to the slurry feeder.

However, when the oxide of manganese sorbent is to be introduced as a dry particulate or powder, both drying and comminuting to size the oxides of manganese particles is typically performed. Dryer 18 may be a kiln or other suitable dryer used for such purposes and known to those skilled in the art. Dryer 18 may utilize waste heat generated by combustion which is transferred or exchanged from combustion or process gases at an industrial or utility plant. When drying is required the temperature should be below the thermal decomposition temperature of oxides of manganese but sufficiently high so as to drive off surface water or moisture without removing any waters of hydration or water of crystallization. Temperatures around 100° C. to 160° C. have been found to be adequate for this purpose. Drying can be conducted at lower temperatures but drying time may be uneconomically extended; and at higher temperatures, which can be utilized in Applicants' invention, short drying time will have to be closely observed so as to avoid thermal decomposition of the oxides of manganese, driving off structural water, or undesired damage to the crystalline structure of the oxides of manganese.

In another embodiment of the regeneration methods of the invention,oaded sorbent is processed without a pre-oxidation rinse. This is illustrated in FIG. 4, where the loaded sorbent first is mixed with an adequate quantity of water to form a loaded sorbent slurry and metered, through appropriate means known to those skilled in the art, directly into orifice 92 leading into continuous flow reactor 24, referred to herein as continuous flow regeneration/precipitation reactor 24, of regeneration system 20 without a pre-oxidation rinse. The system 20, as depicted, includes at least one static mixer 25, probes 23A-23D, filtration unit 26, rinse 27, dryer 28, and comminuting device 29. In the interest of avoiding undue repetition, Applicants note that the components of system 20, absent the pre-oxidation rinse 12, are essentially the same components as that of system 10 and that the function and operation of the corresponding system components will be the same in both embodiments of the systems and of the methods of the invention as depicted in FIGS. 3 and 4. The statements made above regarding the corresponding counterpart components and process steps in regeneration system 10 of FIG. 3 and operating conditions and parameters (temperature, pressure, Eh, and pH) are equally applicable to the components of system 20 of FIG. 4 and therefore they are not repeated here. Further, in this embodiment, the method proceeds in substantially the same manner as described above with reference to FIG. 3 following the pre-oxidation rinse 12 where the rinsed sorbent slurry is introduced or mixed with the oxidant/base solution and introduced into continuous flow reactor 14. However, in this embodiment, the dissociated ions of the reaction products are retained and processed in the same continuous flow reactor 24, as the solid oxides of manganese particles upon which the reaction products formed. Thus, in addition to the solid oxides of manganese, the regeneration slurry being processed in reactor 24 will also contain disassociated reaction product ions.

If the reaction products are manganese salts, e.g., manganese sulfate ($MnSO^4$) and manganese nitrate ($Mn(NO_3)_2$),: $Mn^{+2}$, $SO_4^{-2}$, $NO_3^{-1}$, spectator ions, suspended solids or othe particulates will be in the regeneration slurry solution. While the solid oxides of manganese are being regenerated, the $Mn^{+2}$ ions are at the same time being precipitated out of solution as newly formed oxides of manganese. As in the regeneration method illustrated in FIG. 3 and discussed above, the solution temperature and pressures are maintained and controlled to be within the boundaries of the $MnO_2$ stability window at the prescribed operating or processing temperature and pressure. Similarly, the regeneration slurry is metered through the orifice and conditions in the slurry are monitored and adjusted with respect to temperature, pressure, Eh, and pH, as necessary, to move and maintain conditions within the $MnO_2$ stability area as processing proceeds in continuous flow reactor 24. The end product is a combination of regenerated and precipitated oxides of manganese having high oxidation states and/or high or increased pollutant loading capacities. The solid sorbent particles may, in part, serve as substrates on to which newly formed $MnO_2$ is precipitated. In all other respects processing and handling of the combined regenerated and precipitated sorbent follows that as above described with regard to FIG. 3.

When a pre-oxidation rinse is employed as in FIG. 3, the pre-oxidation filtrate contains the disassociated reaction products, including $Mn^{+2}$ ions which can be precipitated out of solution as oxides of manganese without solid oxides of manganese particles being present in the solution. This is depicted in FIG. 5 where the pre-oxidation filtrate is shown being directed to a continuous flow reactor 34 of precipitation subsystem 30. The precipitation subsystem 30, as depicted includes, the continuous flow reactor 34 equipped similarly to continuous flow reactor 14, with at least one static mixer or mixing device 35, and probes 33A-33D; filtration unit 36; rinse 37; dryer 38 and comminuting device 39. As previously discussed above with reference to systems 10 and 20 and the methods practiced therein, the components of the continuous flow reactor subsystem 30 and steps of the method of the invention carried out therein are substantially the same though numbered differently and in a some instances termed differently. Nonetheless, the corresponding system components of the earlier discussed embodiments of the systems 10 and 20 of the invention and the steps of the methods as described herein above are substantially the same. The statements made above regarding the corresponding counterpart components of regeneration systems 10 and 20 and operating conditions and parameters (temperature, pressure, Eh, and pH) are equally applicable to the components of the precipitation subsystem 30 of FIG. 5 and the steps carried out therein. Therefore, they are not repeated here in order to avoid undue repetition. Further, in this embodiment the method proceeds in a similar manner as described above with reference to FIGS. 3 following the pre-oxidation rinse 12 or with reference to FIG. 4. The obvious difference being that no solid oxides of manganese are initially present in the pre-oxidation filtrate and oxidant/base pre-mixed solution being processed in continuous flow reactor 34.

The pre-oxidation filtrate is heated to or maintained at the operational temperatures of about 100° C. or greater, prior to introduction into continuous flow reactor 34 and is combined with a preheated aqueous premixed oxidizer/base solution in the continuous flow reactor 34 is to form a precipitation solution. Utilizing the probes 33A-33D, precipitation solution temperature, pressure, pH, and Eh are respectively monitored and controlled. As precipitation proceeds, temperature, pressure, pH, and Eh adjustments, as previously described herein above, can be made as necessary to move and/or maintain precipitation solution conditions within the $MnO_2$ stability area as $MnO_2$ precipitation proceeds. The resultant precipitated oxides of manganese whether dried and comminuted or utilized as a filter cake or slurry will have oxidation states and/or loading capacities equal to or greater than the oxides of manganese originally utilized and upon which the reaction products were formed.

Figure 6:
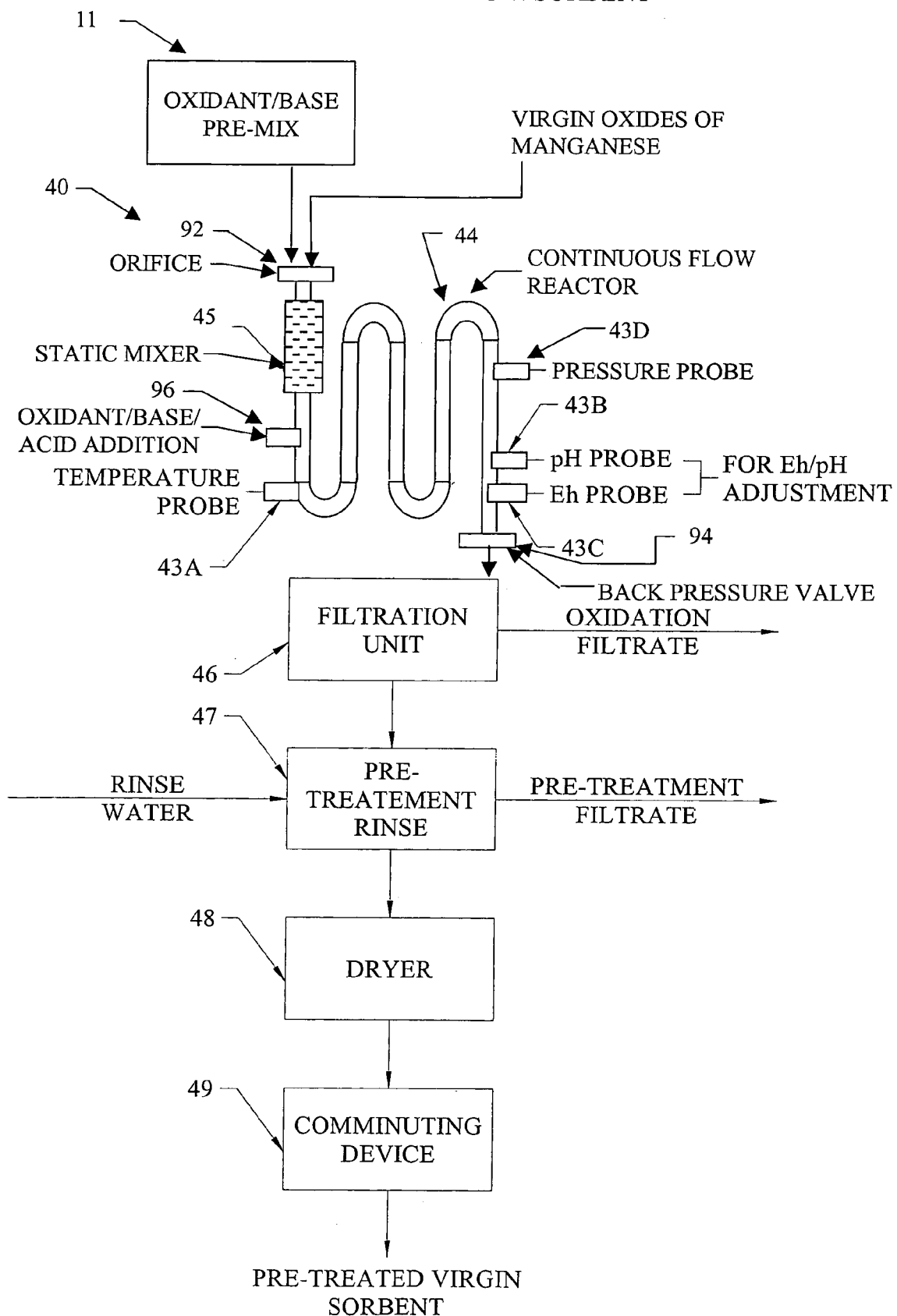
FIG. 6 is a block flow diagram of a system and process according to the invention.

Another embodiment of the invention relates to the pretreatment of virgin oxides of manganese, whether of the NMD, EMD or CMD type, to increase their loading capacity and/or their valence state. This means that oxides of manganese that otherwise might not be economical for use as a sorbent in, for example, a Pahlman™ or other pollutant removal system or for other commercial applications due to poor loading capacity or low valence states may be made viable for such uses. The method of this embodiment can be understood with reference to FIG. 6. In this figure, pretreatment system 40, as depicted, includes a continuous flow reactor 44 equipped similarly to previously discussed continuous flow reactors with at least one static mixer or appropriate agitator 45, probes 43A-43D, filtration unit 46, rinse 47, dryer 48, and comminuting device 49. In the interest of avoiding undue repetition, Applicants note that the components of system 40, absent the pre-oxidation rinse 12, are essentially the same components as that of system 10 and that the function and operation of the corresponding system components will be the same in both embodiments of the systems and of the methods of the invention as depicted in FIGS. 3 and 6. Further, the statements made above regarding the corresponding counterpart components and process steps in regeneration system 10 of FIG. 3 and operating conditions and parameters (temperature, pressure, Eh, and pH) are equally applicable to the components of system 40 of FIG. 6 and therefore they are not repeated here. Further, in this embodiment the method proceeds in substantially the same manner as described above with reference to FIG. 3 following the pre-oxidation rinse 12 where rinsed loaded oxides of manganese are made into slurry, specifically a rinsed sorbent slurry, by the addition of an appropriate quantity of water and introduced into the continuous flow reactor 14.

Applicants have found that the loading capacity and/or valence state of virgin oxides of manganese, both naturally occurring (NMD) and synthetic (EMD and CMD) can be increased through pretreatment according to this method. Following the processing steps of the embodiment of the method of the invention depicted in FIG. 3 following the pre-oxidation rinse, as previously discussed above, excepting that a sorbent slurry of virgin oxides of manganese is being introduced into continuous flow reactor 44 instead of the sorbent slurry of rinsed loaded oxides of manganese being introduced into the continuous flow reactor 14. The resulting pretreated oxides of manganese may be rinsed, dried and comminuted, as appropriate as described above.

Figure 7:
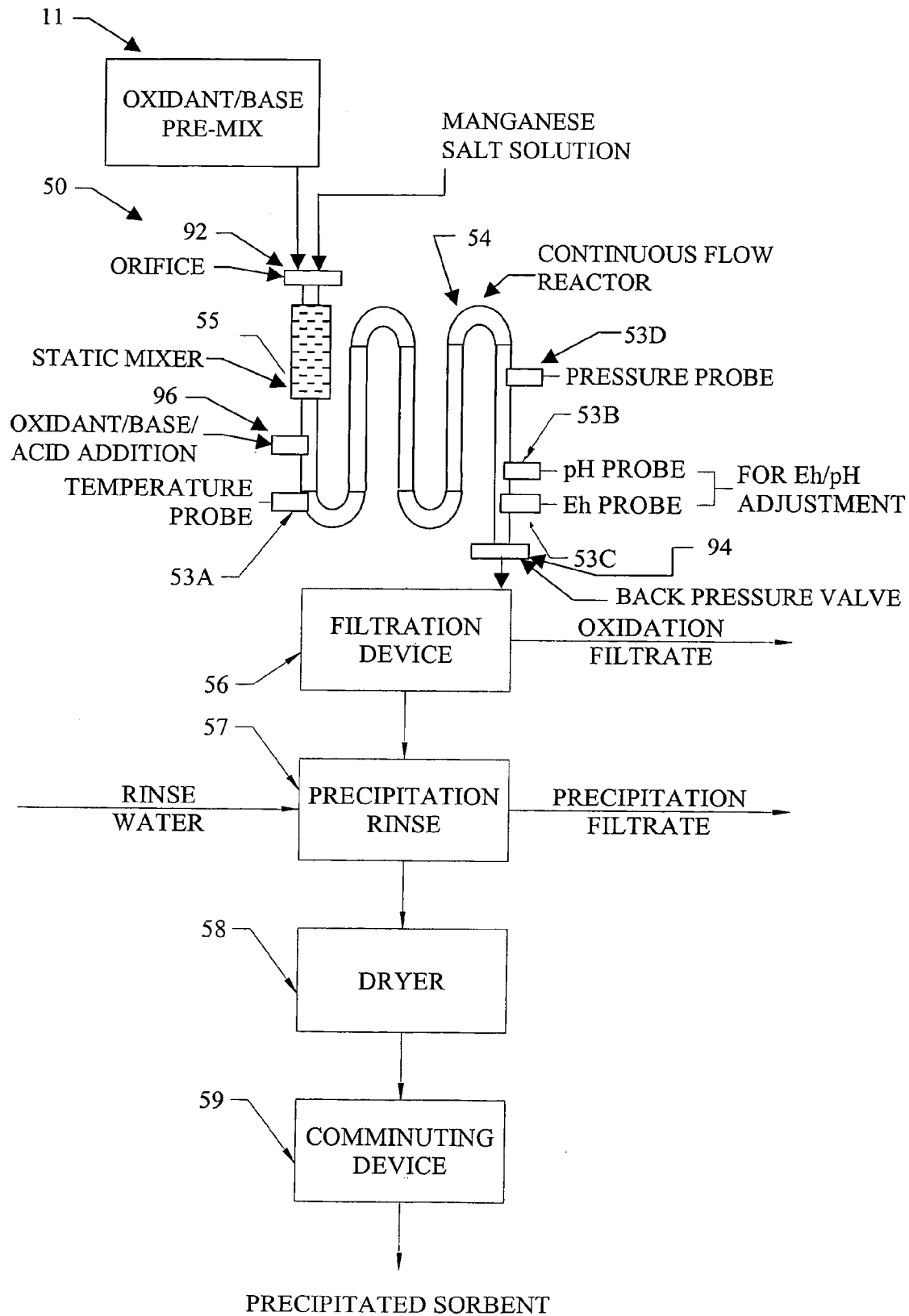
FIG. 7 is a block flow diagram of a system and process according to the invention.

Yet another embodiment of a method of the invention can be understood with reference to FIG. 7 which depicts a precipitation system 50 according to the invention. The operation of this system is substantially the same as precipitation subsystem 30 depicted in FIG. 5 The precipitation system 50, as depicted, includes a continuous flow reactor 54 equipped with at least one static mixer or agitator 55, probes 53A-53D, filtration unit 56, rinse 57, dryer 58, and comminuting device 59. Again, as previously discussed above with reference to the other embodiments systems of the invention and the methods practice therein, the components of the precipitation system 50 and steps of the method of the invention carried out therein are substantially the same though numbered differently and in some instances termed differently. Nonetheless, the corresponding system components of the earlier discussed embodiments of the systems of the invention and the steps of the methods as described herein above are substantially the same. The statements made above regarding the corresponding counterpart components of regeneration systems 10 as applied to the precipitation subsystem 30 and operating conditions and parameters (temperature, pressure, Eh, and pH) are equally applicable to the components of precipitation system 50 of FIG. 7 and the steps carried out therein. Therefore, they are not repeated here in order to avoid undue repetition. Further, in this embodiment, the method proceeds in a similar manner as described above with reference to FIGS. 3 following the pre-oxidation rinse 12 with specific reference to precipitation subsystem 30 depicted in FIG. 5. Again, no solid oxides of manganese are initially present in solution in the continuous flow reactor 54.

In FIG. 7, preheated aqueous premixed oxidant/base solution and heated manganese salt solution are introduced into continuous flow reactor 54 and form a precipitation solution. The preheated premixed oxidant/base solution is so prepared as to have conditions that, when added at or before the orifice plate, move the precipitation solution into the $MnO_2$ stability area. The preheating of the constituent solutions prior to mixture serves to avoid or minimize the precipitation of lower oxides of manganese. Utilizing the probes 53A-53D, temperature, pressure, pH, and Eh are respectively monitored and thereafter adjusted and maintained within the $MnO_2$ stability area by introduction of additional oxidizing solution and base or acid and with temperature and pressure adjustment, all as necessary. The resultant precipitated oxides of manganese whether dried and comminuted or utilized as a filter cake or slurry will have high or increased loading capacities and/or valence state that are equal to or greater than that of commercially available NMD, EMD and CMD.

Precipitated oxides of manganese, whether formed in precipitation subsystem 30 or in precipitation system 50 may be filtered, decanted or otherwise collected and dried. If further oxidation of the precipitated oxides of manganese is required, the drying step may be carried out in an oxidizing atmosphere. Alternatively, in accordance with the methods of the invention, an oxidizer, as previously described may be introduced into vessel 30 or 50 while the oxides of manganese are being formed and precipitated. For example air or oxygen can be bubbled through or a persulfate or other suitable oxidizer may be used. As the oxidation and precipitation of the manganese ions occurs as previously discussed in this application, the newly precipitated oxides of manganese have a valence state close to 4+ and an oxidation strength in the range of 1.5 to 2.0, preferably 1.7 to 2.0, and has a BET value ranging from about 1 to 1000 $m^2/gr$. With comminuting, oxides of manganese particles can be sized for industrial and chemical application uses and particularly a particle size ranging from 0.5 to about 500 microns and be sent to the sorbent feeder for reuse in removal of target pollutants.

As discussed later herein below, the oxidation filtrates from filtration devices 36 and 56 and the rinse filtrates from the rinses 37 and 57 will contain disassociated cations and anions such as potassium, sodium, ammonium, sulfates and nitrates which can be made into fertilizer products or other products such as oxidants, fertilizers, explosives or marketed as is.

Figure 8:
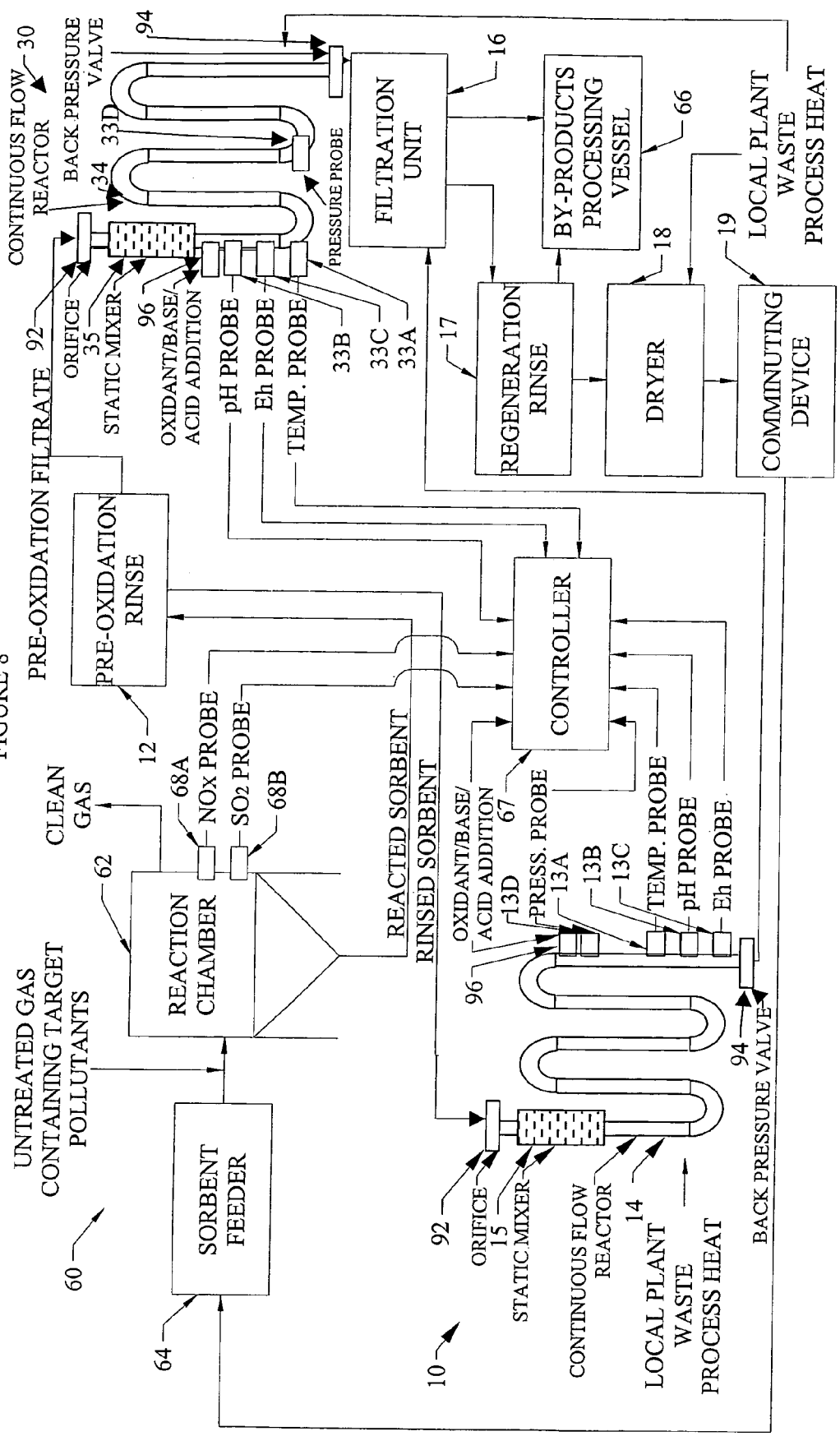
FIG. 8 is a block flow diagram of system and process according to the invention with electronic controls.
Figure 9:
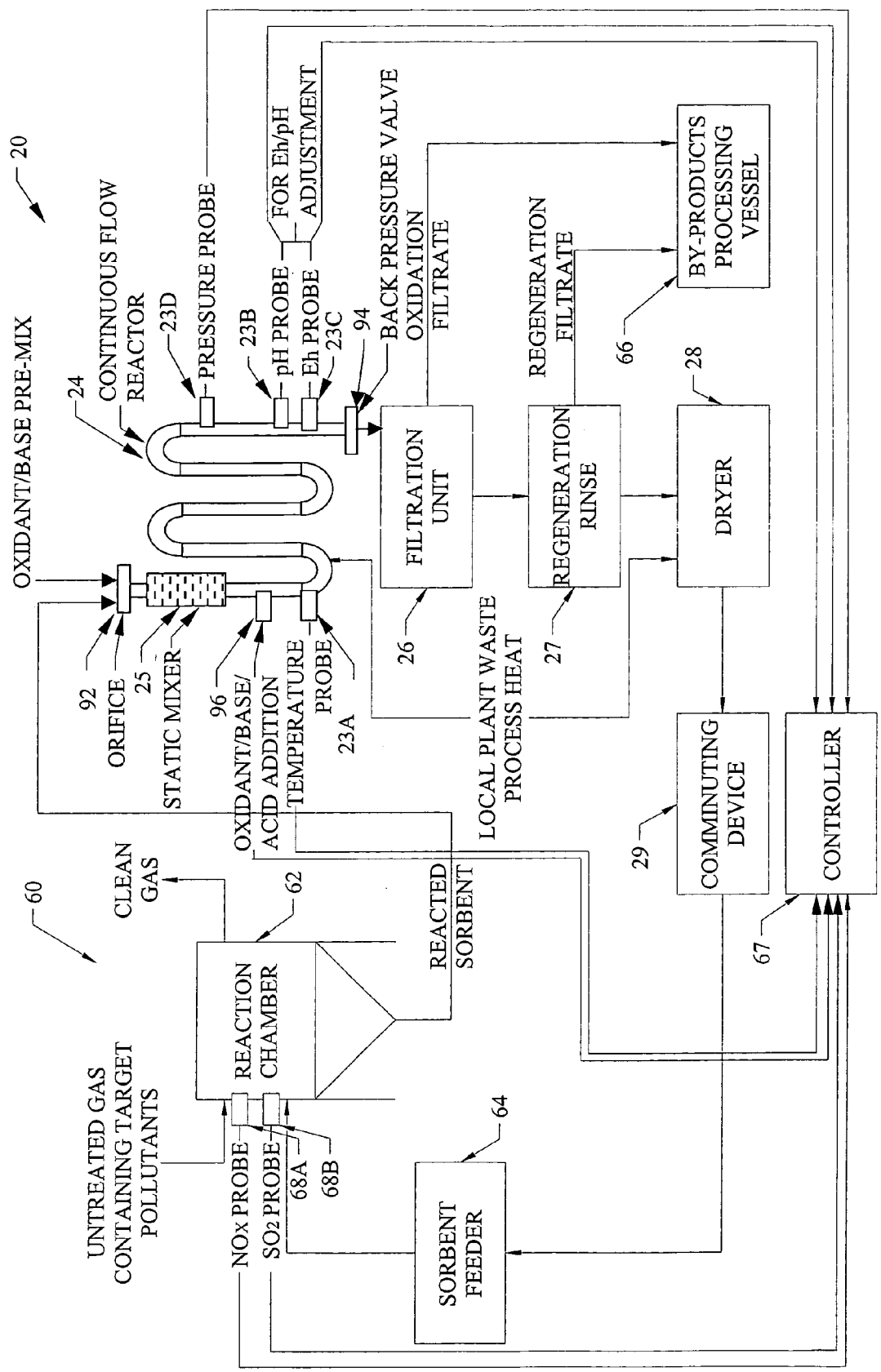
FIG. 9 is a block flow diagram of system and process according to the invention with electronic controls.
Figure 10:
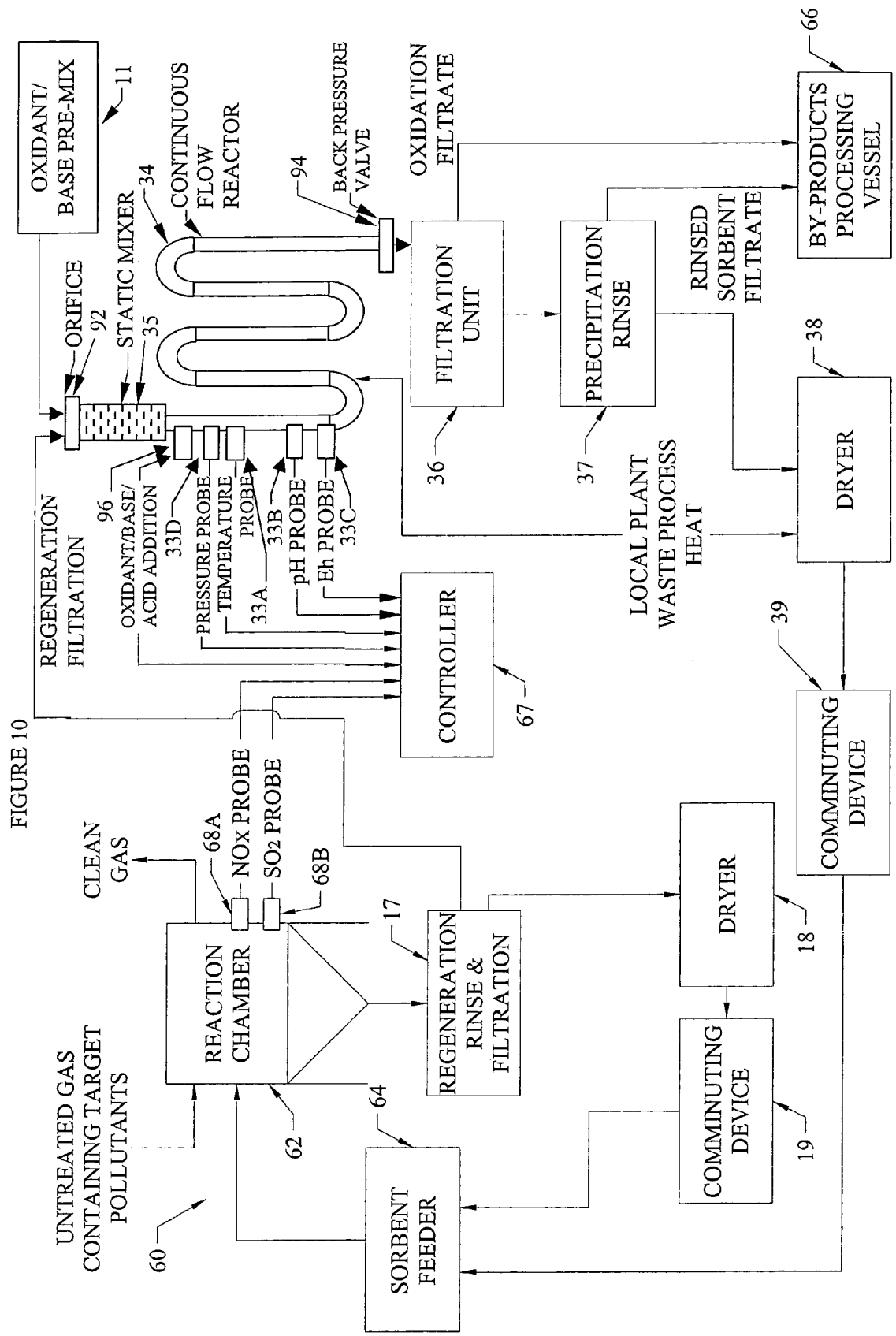
FIG. 10 is a block flow diagram of system and process according to the invention with electronic controls.

Monitoring and adjustment of the conditions of the continuous flow reactors employed in the different embodiments of the invention are carried out utilizing electronic controls. FIGS. 8-10 illustrate embodiments of the invention incorporating an electronic controller 67 to provide adaptive integrated simultaneous monitoring and adjustment of operational parameters, e.g., temperature, pressure, molarity, Eh, and pH, within the continuous flow oxidation reactor with an optional feed back loop for checking the loading capacity of the oxides of manganese produced according to the methods of the invention. Controller 67 may be in electronic communication with or operatively connected to the various probes, orifice 72, valve 74, metering devices, agitation devices, sonication devices and other system components.

In FIGS. 8-10, embodiments of the continuous flow regeneration and/or precipitation reactor systems are depicted as being integrated with a pollutant removal system 60 that utilizes oxides of manganese as a sorbent for target pollutant removal.

The system 60 is a representation of pollutant removal systems in general and it should be understood that the system 60 could be a wet scrubbing removal system, a dry removal system or a combination thereof. System 60 as represented includes a reaction chamber 62 and a sorbent feeder 64 which contains and/or is configured to feed oxides of manganese to the reaction chamber 62. Depending upon the type of reaction chamber, oxides of manganese may be fed as a dry powder or dry particles, as slurry, or as a wet filter cake. Viewed as a representation of a Pahlman™ removal system, a stream of untreated gas containing target pollutants is shown entering into the reaction chamber 62. In this system 60, gas and sorbent oxides of manganese are introduced into the reaction chamber 62 and contacted under conditions and for a time sufficient to effect removal of the target pollutant(s) at a targeted removal efficiency rate for the target pollutant(s). It should be understood that the gas and the oxides of manganese may be introduced together. or separately into reaction chamber 62, depending upon the type pollutant removal system and type of reaction chamber employed. Clean gas, gas from which a target pollutant has been removed, is shown to be vented from the reaction chamber 62. Loaded oxides of manganese will be removed from the reaction chamber, as dry reacted sorbent, a filter cake of reacted sorbent or a slurry of reacted sorbent and conveyed for regeneration and/or precipitation processing according to the invention with appropriate handling.

Described in greater detail, one of various embodiments of the Pahlman™ system may be viewed as being comprised of a feeder containing a supply of sorbent or oxides of manganese, at least one bag house configured to receive sorbent and a gas containing target pollutants, such as those identified herein above. Gas is introduced at temperatures ranging from ambient temperature to below the thermal decomposition or liquification temperature of manganese salt reaction products formed between the oxides of manganese and the target pollutant. Gases are introduced into the bag house and contacted with the sorbent for a time sufficient to effect capture of the target pollutant at a targeted pollutant capture rate. The target pollutant or pollutants are captured through formation of the reaction product between the target pollutant and the sorbent. The system will also include a controller for simultaneously monitoring and adjusting system operational parameters. The controller provides integrated control of system differential pressure and other operational parameters selected from the including, but not limited to, target pollutant capture rates, gas inlet temperatures, sorbent feeder rates and any combinations thereof. Differential pressure within the system is regulated by the controller so that any differential pressure across the system is no greater than a predetermined level and the target pollutant is removed at the targeted pollutant capture rate set point.

The system may incorporate more than one reaction zone, both of which may be bag houses. Alternatively, the system may optionally incorporate a reaction zone upstream of a bag house into which gas and sorbent are introduced and subsequently directed to the bag house. Such optional reaction zones may be selected from the group of reaction zones that includes a fluidized bed, a pseudo-fluidized bed, a reaction column, a fixed bed, a moving bed, a serpentine reactor, a section of pipe or duct, an absorber, and a cyclone or multiclone. When two reaction zones are thus connected and the gas stream contains at least two target pollutants, such as $SO_x$ and $NO_x$, for example, the first target pollutant may be captured or removed in the first reaction zone or substantially removed in the first reaction zone and the second target pollutant will be removed in the second reaction zone. This can be advantageously utilized particularly where the two reaction zones are bag houses to capture a first target pollutant such as $SO_x$ in the first reaction zone and a second target pollutant such as $NO_x$ or mercury in the second reaction zone. This would allow for separate regeneration of loaded sorbent having reaction products thereon from reaction between oxides of manganese and a single target pollutant or at least different target pollutants that are captured in the second bag house. Thus, if the target pollutants are $SO_x$ and $NO_x$ this would allow for separate regeneration and filtration of a $SO_x$ loaded sorbent and $NO_x$ sorbent with their respective reaction product ions being disassociated into separate pre-oxidation rinses with the resultant pre-oxidation filtrates also being separately processed to precipitate out oxides of manganese. The respective precipitation filtrates would then allow for separate production of sulfate by-products and nitrate by-products.

Figure 11:
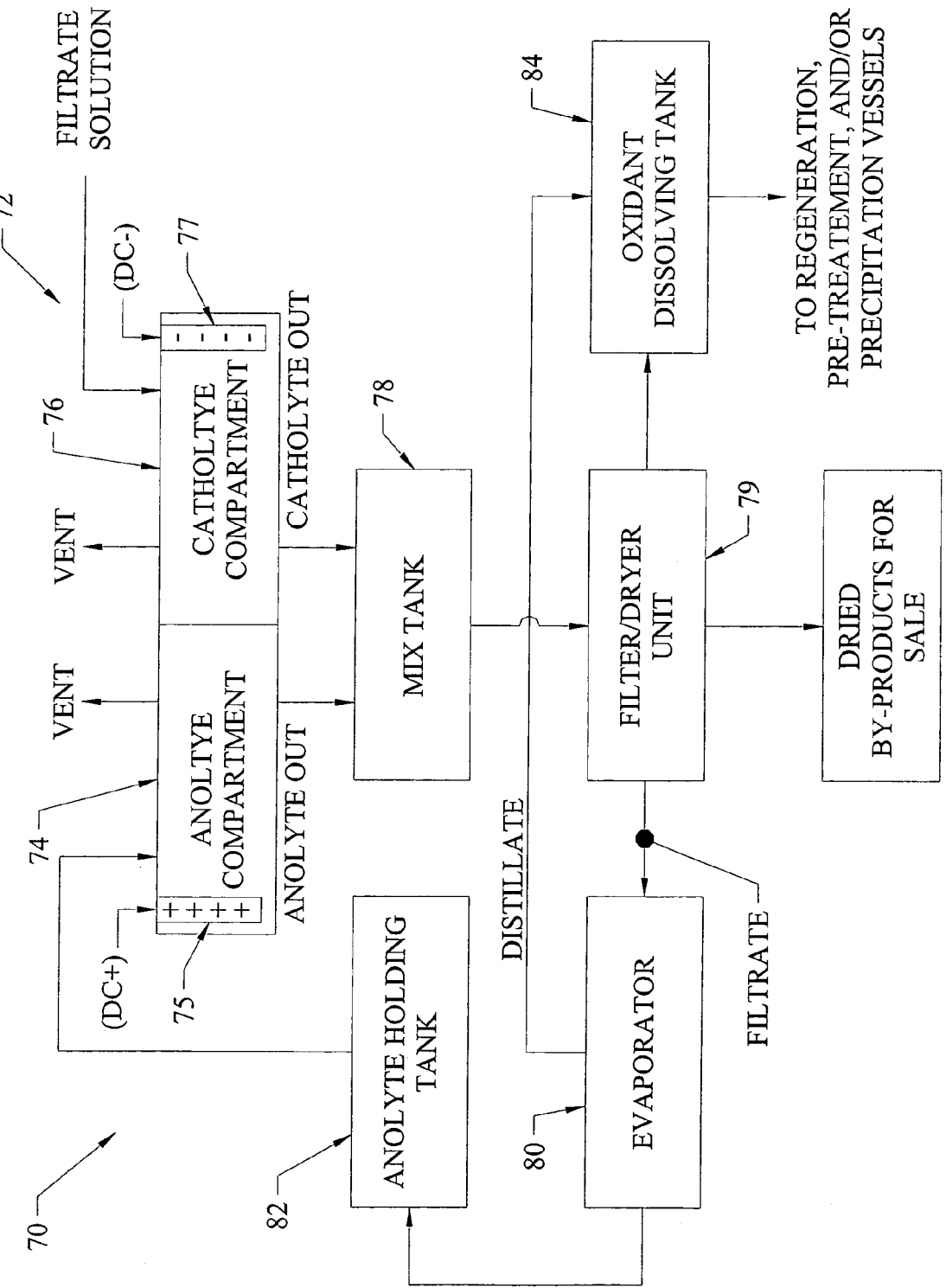
FIG. 11 is a block flow diagram of an electrolytic cell by-products production system and process according to the invention.

With reference to FIG. 8, a regeneration system 10 and precipitation system 30 substantially as depicted in FIG. 5 is illustrated in block flow and is connected to removal system 60. Continuous flow reactor 30 is equipped with temperature probe 33A, pH probe 33B, and Eh probe 33C, and pressure probe 33D; continuous flow reactor 14 is equipped with temperature probe 13A, pH probe 13B, Eh probe 13C, and pressure probe 33D all of which are in electronic communication with a controller 67. A premixed oxidant/base vessel (not shown) containing a preheated oxidant/base solution is configured to feed said solution to continuous flow reactor 30 and continuous flow reactor 14. Alternatively, preheated oxidant/base solution may be routed directly from an electrolytic cell 72, such as shown in FIG. 11, or the output of electrolytic cell 72 may be routed to the oxidant vessel. Loaded sorbent may be conveyed directly from reaction chamber. 62 to regeneration pre-oxidation rinse 12 or it may be directed to a loaded sorbent vessel (not shown) for holding and subsequently conveyed to rinse device 12. The pre-oxidation filtrate from rinse 12 is routed to the continuous flow reactor 34. The rinsed sorbent from pre-oxidation rinse device 12 is slurried as appropriate and routed to the continuous flow reactor 14.

The feeders (not shown) of the premixed oxidant/base vessel, oxidant/base/acid vessel, and loaded sorbent slurry vessels (not shown) are in electronic communication with the controller 67. The controller 67 is also in electronic communication with the Eh probe 33C, pH probe 33B, temperature probe 33A, and pressure probe 33D with which the continuous flow reactor 34 is equipped and Eh probe 13C, pH probe 13B, temperature probe 13A, and pressure probe 13D with which the continuous flow reactor 14 is equipped.

As illustrated, newly precipitated or virgin sorbent from the continuous flow reactor 34 and regenerated sorbent from the continuous flow reactor 14 is routed to filtration unit 16 for filtering. The sorbent is further routed to the rinse device 17 to be further rinsed. Alternatively, filtration unit 16 and rinse 17 may be combined into one device so as to remove filtrate and rinse in a combined operation. Also, sorbent from the continuous flow reactor 30 and the sorbent from continuous flow reactor 14 may each have its own filtration device and sorbent rinse device. Sorbent is then routed to the sorbent dryer 18 As illustrated, sorbent from sorbent dryer 18 is routed to comminuting device 19 and then to sorbent feeder 64 which in turn feeds the sorbent to reaction chamber 62. Alternatively, sorbent from dryer 18 may be routed directly to reaction chamber 62 or to a sorbent storage vessel prior to being directed to the feeder 64.

Reaction chamber 62 is equipped with optional target pollutant concentration readers or continuous emission monitors (CEMS) for $NO_X$ and $SO_2$, readers 68A and 68B, which are in electronic communication with controller 67. It should be understood the reaction chamber 62 may be equipped with other equivalent readers where different target pollutants are being captured.

The controller 67 interfaces with continuous flow reactor 34 probes 33A, 33B, 33C, and 33D; $NO_X$ and $SO_2$ readers 68A and 68B and the premixed oxidant/base vessel, and oxidant/base/acid vessel feeders and vessels (not shown) for measurement and adjustment of operational parameters within reactor 14 and 34. The controller 67 signals the addition of premixed oxidant/base, oxidant, acid, and/or base to continuous flow reactor 34 based upon the inputs received from the probes until the desired Eh/pH reading is obtained prior to addition of the pre-oxidation filtrate into the continuous flow reactor 30. Or controller 67 can be programmed with initial set points corresponding to predetermined amounts of chemical constituents to be added to process solutions based upon historical process data that has been retained. The static mixer or agitator 35 continuously agitates and mixes the combined mixed the solution as it travels through the pipe or continuous flow reactor. The temperature, pressure, pH, and Eh conditions in the continuous flow reactor 34 are monitored and adjusted continuously so as to maintain conditions within the $MnO_2$ stability area.

The controller 67 similarly interfaces with regeneration vessel 14 probes 13A, 13B, 13C, and 13D; $NO_X$ and $SO_2$ readers 68A and 68B and the premixed oxidant/base vessel, and oxidant/base/acid vessel feeders and vessels (not shown) for measurement and adjustment of operational parameters within the vessel 14. Thus, temperature, pressure pH, and Eh conditions in the regeneration slurry in continuous flow reactor 14 are monitored and adjusted continuously so as to maintain conditions within the $MnO_2$ stability area. Continuous flow reactor 34 and continuous flow reactor 14 may be run in parallel operation or alternating operation so as to be able to verify sorbent loading capability using, an optional feedback loop of the controller 67 and probes 68A and 68B.

The controller 67 contains a programmable logic controller (PLC) and other hardware components necessary for the operation of the controller such as a power supply, input and output modules that would communicate with the probes 33A, 33B, 33C, 33D; probes 13A, 13B, 13C, and 13D and/or readers 68A and 68B, and with the premixed oxidant/base vessel, and oxidant/base/acid vessel feeders and vessels (not shown), and loaded sorbent feeder (not shown) and other components. The controller 67 receives inputs from the various probes and readers and converts them into ladder logic language that would be used by an internal control loop, such as a proportional integral derivative (PID) loop or derivation thereof, to individually and simultaneously monitor system operational parameters and to reconcile the inputs with predetermined or computer generated calculated set points for the operational parameters, such as temperature, pressure, Eh, and pH levels, sorbent loading and target pollutant removal or capture rate. As determined by computer logic, the controller 67 will send an output as necessary to any of the feeders of premixed oxidant/base vessel, and oxidant/base/acid vessel (not shown) signaling a feeder to cycle on or to change feeder rate so as to maintain or adjust system operational parameters to within the $MnO_2$ stability area for either continuous flow reactor 34 or continuous flow reactor vessel 14. The controller 67 may also contain an Ethernet card or other component that allows onsite or offsite remote display and operator interface and control as needed.

The controller 67 would be given a start command and direct the loaded sorbent feeder (not shown) to inject predetermined amounts of loaded sorbent into the pre-oxidation rinse device 12. The controller 67 would also signal injection of a predetermined amount of premixed oxidant/base solution to continuous flow reactor 34 and continuous flow reactor 14 while checking and or adjusting the Eh and/or pH of the solution prior to simultaneously feeding in the predetermined amount of pre-oxidation filtrate from the pre-oxidation rinse device 12 into continuous flow reactor 34 and a predetermined amount of rinsed sorbent slurry from the pre-oxidation rinse device 12 into continuous flow reactor 14. The Eh of the precipitation solution in continuous flow reactor 34 and of the regeneration slurry in continuous flow reactor 14 may further be adjusted by addition of an oxidizer in sufficient quantity as to raise the Eh to the desired level from an oxidizer vessel (not shown), containing a supply of oxidizer or aqueous oxidizing solution.

As determined by programmed controller logic, the controller 67 would also check, based on inputs received from precipitation reactor 34 probes 33A, 33B, 33C, and 33D; and continuous flow regeneration vessel 14 probes 13A, 13B, 13C, and 13D. Controller 67 may also check TDS levels base upon inputs received from an optional TDS probe, if provided, for verification and adjustment of molar concentrations of process solution constituents as needed. Conditions in the precipitation solution and in the regeneration slurry may further be adjusted by utilizing a heater or heat exchanger (not shown) to increase or decrease solution temperature; the pH, if needed, by increasing or decreasing the rate of base or acid feed; the Eh, if needed, by increasing or decreasing the oxidizer concentration of the aqueous oxidizing solution or oxidant/base pre-mixed solution; and the pressure, if needed, by controlling the backpressure valve 94

An optional, final quality control loop may be provided, as shown, utilizing the readers 68A and 68B to check the loading performance of the processed oxides of manganese sorbent by sending, for example, $SO_X$ and $NO_X$ readings back to the controller 67. As determined by controller logic, the controller 67 would then adjust continuous flow reactor 34 and/or continuous flow reactor 14 parameters, if needed, to provide precipitated oxides of manganese and regenerated oxides of manganese, respectively, capable of removing target pollutants at the targeted removal rates.

The same controller may also be used to control the entire operation of the removal system 60, the regeneration system 10 and the precipitation system 30 and their components as discussed above including, pre-oxidation rinse 12, filtration unit 16, rinse device 17, dryer 18, comminuting device 19, sorbent feeder device 64 and the by-products processing vessel 66, and electrolytic cell device (not shown but depicted in FIG. 11) or separate controllers may be provided for different components or group of components or functions.

With reference to FIG. 9, the regeneration and precipitation system 20 is depicted as integrated with removal system 60. In the interest of avoiding undue repetition, Applicants note that the operation and control of the integrated systems 20 and 60 with controller 67 can be understood as being substantially the same with respect to corresponding components, shown and not shown, as described immediately above with respect to the integrated systems 10, 30 and 60. The controller 67 will be in electronic communication with the probes of a single continuous flow regeneration/precipitation reactor 24; otherwise, the operation and functions of electronic control and communication is substantially the same as described. With reference to FIG. 10, this is equally applicable to the integration of systems 30 and 60 and the operation and function of electronic communication and control of the corresponding system components. Note that a variation of regeneration and precipitation method is illustrated. In FIG. 10, reacted sorbent is rinsed and filtered and routed to dryer 17. It is not directed to a continuous flow reactor but the pre-oxidation filtrate is routed to continuous flow reactor 34 where precipitation is carried out as previously described. This variation of the method of the invention can be used where the loading capacity oxides of manganese below the reaction product surface coating on the sorbent particles has not been so significantly diminished during pollutant removal as to required chemical regeneration. In such cases, it is sufficient to wash away the reaction products, dissolving and disassociating them into the rinse solution or pre-oxidation filtrate and the rinsed oxides of manganese can then be dried and comminuted if necessary prior to being reused to capture target pollutants. Applicants have found that where the gas stream contains primarily concentrations of $SO_X$ a regeneration rinse is often all that is required prior to reuse of the rinsed sorbent, with recovery of reaction product ions through precipitation and other processing.

During processing according to the invention, valuable and recoverable anions, such as sulfate, nitrate, and chloride will be present in filtrates, for example in the pre-oxidation, oxidation filtrate and regeneration filtrate as shown in FIG. 3, the oxidation and regeneration filtrates shown in FIG. 4, the oxidation and precipitation filtrates shown in FIG. 5, and the oxidation and pretreatment filtrates shown in FIG. 6. The filtrates from the water used in the rinses may be utilized for a number of cycles before the spectator ion concentrations reach levels meriting their recovery.

When using oxides of manganese to capture $SO_X$ and/or $NO_X$, sulfate, and nitrate, reaction products and their corresponding anions will be present in filtrates. They may also be present as well as other anions and cations from the oxidizers, acids and bases used. Sulfate and nitrate byproducts as well as others that may be formed from other spectator ions formed, separated or processed from the various filtrates.

Ion exchange can be utilized as a mechanism for the separation and recovery of useful sulfate and nitrates. The dissolved sulfates and nitrates of manganese in the pre-oxidation filtrate can be processed in anion exchangers, permitting the recovery manganese cations and separation of the sulfate and nitrate anions. To accomplish this separation, the pre-oxidation filtrate, containing dissolved sulfates and nitrates, is passed across or through a bed or column of an anion exchange resin that has an affinity for at least one of the two anions to remove those anions. The resin will absorb the anion, for instance the sulfate, while permitting the nitrate to pass through the bed or column. Additionally, the solution stripped of sulfate can then be passed across or through a second bed or column of yet a second anion exchange resin having an affinity for the nitrate thereby capturing the nitrate. After the resin is loaded, the vessel or vessels containing the resin can be taken off-line and the resin therein stripped of the captured anion and recovered for reuse.

Suitable anion exchange resins and vessels are known to and readily identified by those skilled in the art. For purposes of illustration, the anion exchange resin may have a halogen, for example a chloride, in the exchange position on the resin. By passing a solution contain manganese cations and sulfate and/or nitrate anions over the resin chloride anions are eluted and exchanged for sulfate and/or nitrate anions. The solution, after passing through the anion exchanger or exchangers in series, will contain manganese chloride from which manganese carbonate or manganese hydroxide is precipitated with the addition of a soluble carbonate or hydroxide compound; and oxides of manganese as previously described in the discussion of the production of oxides of manganese from the pre-oxidation filtrate. The sulfates and/or nitrates loaded on the resin can in turn be eluted with a solution containing chlorides of potassium, sodium or ammonium in order to generate useful sulfates and nitrate by-products for marketing or further processing. The filtrates and rinse solutions left over after precipitate formation can be utilized for this purpose.

The solubility of manganese nitrate is greater than 1.5 times the solubility of manganese sulfate. Solubility of the nitrate is 61.7 mass percent of solute at 250° C., whereas the solubility of sulfate is 38.9 mass percent of solute at 250° C. (Handbook of Chemistry and Physics.) Fractional crystallization, a separation technique known to those skilled in the art, can take advantage of the solubility difference to isolate nitrates of manganese and sulfates of manganese from the pre-oxidation filtrate. The filtrate may be cooled and/or evaporated to cause the crystallization of the lesser soluble manganese sulfate which can then be harvested as solid crystals. The solution remaining can be recycled to pre-oxidation rinse 12 for reuse. Once the concentration of manganese nitrate is sufficiently high, the solution after crystallization of sulfates is further cooled and/or evaporated to crystallize the nitrates which can then be harvested as solid crystals. Alternatively, the solution can be processed with hydroxides or carbonates, as previously described herein above, to generate oxides of manganese and marketable nitrate by-products.

Another variation upon the methods of the invention would utilize the difference in thermal decomposition temperatures of nitrates and sulfates of manganese. Nitrates of manganese are reported to decompose at temperatures between 140° C. to 450° C. to form NO and oxides of manganese. However, sulfates of manganese are understood to liquefy at elevated temperatures but in the presence of trace amounts of a reducing agent, e.g., carbon monoxide or hydrogen, they decompose to $SO_2$ and MnO which when further heated in an oxidizing atmosphere form oxides of manganese. Reacted sorbent loaded with both nitrates and sulfates of manganese may be heated, prior to introduction into either continuous flow reactor 14 or pre-oxidation rinse 12, in an oxidizing atmosphere whereupon manganese oxide is formed and nitrogen dioxide and/or sulfur dioxide are desorbed and captured. If both reaction products are to be thermally desorbed, the reacted sorbent may be heated to and maintained at a first temperature at which nitrates of manganese, primarily, if not exclusively, desorb. The temperature could then be elevated to desorb the sulfates of manganese loaded on the sorbent. Whether one or both reaction products are desorbed, the oxides of manganese may then be processed in continuous flow reactor 14 as described herein above and the desorbed gas or gases captured and further processed. If the nitrates are first thermally desorbed, the sorbent may be routed either through a pre-oxidation rinse or routed directly to an oxidation vessel 14. The recovery of useful sulfate by-products would be as previously described from either a pre-oxidation filtrate or an oxidation filtrate.

As previously mentioned above oxidizer or oxidizing solutions can be formed on-site in an electrolytic cell utilizing process streams generated in the methods of the invention. FIG. 11 depicts electrolytic cell 72 used for oxidant production and by-product production along with other beneficial integrated functions that may be used in a Pahlman ™ or other pollutant removal system. Given the cost of oxidants and the ion values left in the process streams of the invention, it would be useful and highly advantageous to produce oxidants or oxidizers on-site in electrolytic cell 72 and not purchase them for one time use as it would be prohibitively expensive.

As illustrated in FIG. 11, the Electrolytic Cell and By-Products diagram, oxidant production system 70 includes electrolytic cell 72. Electrolytic cell 72 has an anolyte compartment 74 with a vent, a positively charged anode 75, a catholyte compartment 76 with a vent, a negatively charged cathode 77, a diaphragm (not shown) dividing the anolyte compartment 74 and the catholyte compartment 76. Oxidant production system 70 further includes a mixing tank 78, a cooler (not shown), a filter/dryer unit 79, an evaporator 80, an anolyte holding tank 82 and oxidant dissolving tank 84.

Filtrate solutions containing useful values, such as those shown coming from the rinses and filtration units in FIGS. 4-10 and shown being directed to by-products processing vessel 66 may contain ions from reaction products, such as sulfates, nitrates, and chlorides, from oxidants, bases and acids, and other constituents such as heavy metals. The filtrate solution, containing sulfate anions for example, is routed to the catholyte compartment 76 where it comes in contact with the cathode 77 that is negatively charged with a direct current (DC) voltage. At the same time, a solution of ammonium sulfate contained within the anolyte holding tank 82 is routed to the anolyte compartment 74 where it comes in contact with the anode 75 that is positively charged with a direct current (DC) voltage.

The ammonium sulfate is purchased and brought in to charge the anolyte compartment and is a closed loop that will from time to time need makeup. In electrolytic oxidation, the sulfate ($SO_4^{-2}$) anion component of the ammonium sulfate $(NH_4)_2SO_4$ within the anolyte compartment 74 is converted to an ammonium persulfate $(NH_4)_2S_2O_8$. Some of the now free ammonium ions migrate across the diaphragm to the catholyte compartment 76. There will be migration or leakage of cations and anions across the diaphragm that is between the positively charged anolyte compartment 74 and the negatively charged catholyte compartment 76. Nearly all the potassium sulfate ($K_2SO_4$) that is formed from interaction between the potassium cation from previous additions of potassium hydroxide (KOH) in the system and the stripped sulfate anion from the manganese sulfate ($MnSO_4$) within the catholyte compartment 76 passes through to the mixing tank 78. There will also be ammonium sulfate or ammonium hydroxide mixed with the potassium sulfate leaving the catholyte compartment 76 depending upon the pH. An acid and or base may be introduced to the catholyte compartment 76 to adjust pH and is also used to adjust mass balances of cations and anions. Heavy metals, such as mercury and arsenic as an example, amongst many other kinds of metals, present in the filtrate will be plated out on the cathode or, depending upon the pH of the solution, could precipitate out as an oxide.

Both the anolyte compartment 74 and the catholyte compartment 76 are continually being filled and continually drained. The anolyte compartment 74 drains into the mixing tank 78 and the catholyte compartment 76 drains into the mixing tank 78. Ammonium persulfate (($NH_4)_2S_2O_8$) from the anolyte compartment 74 mixes with potassium sulfate ($K_2SO_4$) from the catholyte compartment 76 within the mixing tank 78. The electrolytic cell 72 and the mixing tank 78 are cooled with a cooler (not shown) to around 15° C. Solutions entering and exiting the electrolytic cell 72 will be within a few degrees of 15° C. One may choose to run the electrolytic cell 72 at higher temperatures but there is reduced efficiency. Due to the solubility differences of ammonium persulfate and potassium persulfate it is possible to precipitate out the potassium persulfate as it has a much lower solubility than ammonium persulfate. The liquor containing crystals of potassium persulfate and ammonium sulfate in solution is routed to the filter/dryer 79 and the potassium persulfate crystals are separated from the liquor.

The potassium persulfate crystals may then be dried for sale and a portion of the potassium persulfate crystals may be routed to the oxidant dissolving tank 84. Distillate from the evaporator 80 is routed to the oxidant dissolving tank 84 to dissolve the potassium persulfate crystals and make a solution that may then be routed for use in sorbent regeneration, pretreatment, and or precipitation according to the invention. The solution of ammonium sulfate that has been separated from the potassium persulfate in the filter/dryer 79 is routed to the evaporator 80. Through evaporation, the concentration of the ammonium sulfate is increased to an acceptable point that provides for a high degree of conversion efficiency into an ammonium persulfate in the anolyte compartment 74. The high concentration of ammonium sulfate solution in the evaporator 80 is routed to the anolyte holding tank 82 to be further routed to the anolyte compartment 74 of the electrolytic cell 72 in a continuing cycle. A polarizer may be used in the anolyte compartment 74 to increase anode efficiency such as but not limited to $NH_4SCN$.

During the electrolytic process there is electrolysis of water into hydrogen at the cathode and oxygen at the anode. These compounds will exit the vents of their respective compartments of the electrolytic cell 72. By adjusting the parameters of the electrolytic cell 72, it is possible to decompose nitrate ions $NO_3^{-1}$ and vent them from the electrolytic cell. Other compounds, including but not limited to, chlorides and fluorides that are found in industrial process gas streams that get removed in the sorbent capture and regeneration system may be vented from the catholyte compartment 76 or the anolyte compartment 74 during the operation of the electrolytic cell as a gas. This is one way to separate them from the by-products that are being created, although not the only way. This would avoid having to separate anions that are not compatible to by-product operation and sales. It is desirable to use acids and bases that have compatible ions and cations. For example, potassium hydroxide would be used with potassium persulfate or potassium sulfate. Likewise, a compatible acid to go with these would be sulfuric acid ($H_2SO_4$). This greatly aids in by-product separation from pregnant liquors.

Applicants use sulfate containing filtrate solution and ammonium sulfates for purposes of illustrative explanation of the operation and method of production in an electrolytic cell. It should be understood that the filtrate may contain different ion constituents from which different oxidants, such those earlier identified herein, may be made. Again, attention to compatibility may ease processing when certain by-products are to be formed.

The above-described oxidant production methods may be combined with other processing steps to produce useful and marketable by-products from the values in the filtrates and rinse solutions routed to by-products vessel 66. For example, manganese oxides or useful salts may be produced. The ability to produce oxidants from the process streams may eliminate or reduce cost of purchasing commercially available oxidants for use in the methods of the invention.

A derivation of an electrolytic cell, an internal electrolytic cell may optionally be installed within the tube or pipe of the continuous flow reactor section before the backpressure regulator or similar device and downstream of the static mixer. This optional use of electrolytic cell technology could be applied to all embodiments of the Applicant's invention that utilize a continuous flow reactor for the precipitation regeneration and pretreatment of oxides of manganese. Operation of the internal electrolytic cell would be conducted as one skilled in the art of electrolytic process would have knowledge. There would be cathodes and anodes within the tube or pipe of the continuous flow reactor and, as consistent with the first embodiment, the continuous flow reactor can be maintained and controlled to specific temperature, pressures, pH, and Eh set points that serve to keep the conditions within the continuous flow reactor within the $MnO_2$ stability window. The high current directed across the cathodes and anodes helps provide beneficial characteristics to the sorbent particle, increases the yield of $MnO_2$ and increases sorbent loading capacity and/or oxidation strength. A benefit of integrating an internal electrolytic cell into a continuous flow reactor is that less oxidant may be required to provide the necessary solution Eh and oxidant could also be regenerated in situ. The polarity of the cathodes and anodes can be reversed at a particular frequency if necessary to prevent and/or release any sorbent buildup; or as in EMD production in electrolytic cells, an automatic electrode cleaning device may be installed.

Sonic probes or sonication devices can optionally be installed and operated after and/or within a static mixer and/or immediately after orifice 92 prior to a static mixer to impart acoustic energy in the form of ultrasonic or infrasonic waves into solution mixtures or slurries and to the oxides of manganese being precipitated, regenerated, and/or pretreated. The use of sonic or acoustic energy has shown to have beneficial effects on certain sorbent characteristics that can favorably impact sorbent loading capacity. Adjustment of particle characteristics may also be achieved by other means such as pressure fluctuation, high speed mixing; timing, placement, and order of solution injection, and or any combination of these or more. Such characteristics may include particle size and shape, crystalline structure or morphology, porosity, composition, surface area, pore volume, bulk density, electrochemical or oxidation potential or manganese valence states.

Acoustic energy, as applied industrially, includes the range from ultrasonic, which is short-wave, high-frequency (greater than 20,000 Hz.) energy, to infrasonic, which is long-wave, low-frequency (less than 20 Hz.) energy. All forms of acoustic energy are transmitted as pressure waves, and are usually generated by specialized devices or transducers which convert electricity or pressurized air into acoustic energy within the desired frequency range.

There are many commercial manufacturers of ultrasonic equipment or sonication devices such as small or laboratory scale ultrasonic equipment like those available from the Cole-Parmer Instrument Company and large scale equipment, such as high pressure and /or high temperature devices available from Misonix. Such sonication devices may also be used and incorporated into other system components, such as oxidant, acid or base vessels and vessel in which water and manganese salts or oxides of manganese are mixed to form solutions or slurries.

The application of acoustic energy during processing of oxides of manganese may be doing all or some of the following actions: (1) enhancing agitation during sorbent processing to improve reaction rates and enhance mixing; (2) promoting rapid dissolution of reaction products from loaded sorbent surfaces during regeneration; (3) increasing dissolution rates of chemicals used in the processing of oxides of manganese; (4) altering structural development of crystal structure during and following precipitation from solution; and (5) breaking up large oxides of manganese crystal formations. In the methods and systems of the invention, acoustic energy would be generated by specialized devices or transducers and directed which may optionally be incorporated into the continuous flow reactor 14, 24, 34, 44 and 55. Such sonication devices may be used and incorporated into other system components, such as oxidant, acid or base vessels, premixed oxidant/base or vessel in which manganese salts are mixed with water prior to precipitation processing.

With the methods and processes disclosed herein Applicants can combine sorbent processing systems with pollutant removal system to form an integrated pollution control and sorbent processing systems. Such a system may be configures as follows. The integrated pollution control and sorbent processing system comprises a pollutant removal subsystem for removal of target pollutants from gases and a sorbent processing subsystem for rapid and adaptive processing of oxides of manganese.

The pollutant removal subsystem comprises a feeder containing a supply of sorbent, at least one reaction chamber and a pollutant removal controller. The feeder is configured to handle and feed sorbent. The sorbent comprise oxides of manganese. The at least one reaction chamber is configured to receive sorbent and a gas containing at least one target pollutant. The at least one reactions chamber is selected from the group of reaction zones that includes a fluidized bed, a pseudo-fluidized bed, a reaction column, a fixed bed, a moving bed, a serpentine reactor, a section of pipe or duct, and a cyclone. Gas is introduced into the reaction chamber at temperatures ranging from ambient temperature to below the thermal decomposition temperature of a reaction product formed by a reaction between the target pollutant and the sorbent. The gas is contacted with the sorbent for a time sufficient to effect capture of the target pollutant at a targeted capture rate set point. The target pollutant is captured by reacting with the sorbent to form the reaction product to substantially strip the gas of the target pollutant. The reaction chamber is further configured to render the gas that has been substantially stripped of the target pollutant free of reacted and unreacted sorbent so that the gas may be vented from the reaction chamber. Differential pressure within the system is regulated so that any differential pressure across the system is no greater than a predetermined level. The pollutant removal controller provides integrated control of system differential pressure and other operational parameters selected from the group consisting of target pollutant capture rate gas inlet temperature, sorbent feed rate and any combination thereof. Differential pressure within the system is regulated so that any differential pressure across the system is no greater than a predetermined level and the target pollutant is removed at their targeted capture rate set points.

The sorbent processing subsystem comprises a continuous flow reactor, a manganese vessel; an oxidant vessel, a plurality of heating units, a base and/or acid feeder for feeding base or acid to the continuous flow reactor, a least one filtration and/or rinse unit and a controller. The continuous flow reactor is equipped with an orifice, a back pressure valve, probes for measuring temperature, pressure, Eh and pH values of aqueous solutions within the continuous flow reactor. The continuous flow reactor is configured for introduction of an aqueous oxidizing solution and a manganese containing solution a manganese containing solution selected from the group consisting of a slurry of virgin oxides of manganese, a regeneration slurry containing rinsed reacted oxides of manganese, a slurry of loaded oxides of manganese containing disassociated manganese cations, and a manganese salt solution containing disassociated manganese cations. The manganese containing solution and the aqueous oxidizing solution are processed together in the continuous flow reactor as a combined mixed processing solution. The manganese vessel is equipped with a feeder and contains the manganese containing solution. The oxidant vessel is equipped with a feeder and contains a supply of the aqueous oxidizing solution. The oxidizing solution is prepared to have Eh and pH values within a permanganate stability area or an $MnO_2$ stability area or to move solution conditions initially into the permanganate stability area or an $MnO_2$ stability area when contacted with the manganese containing solution. The plurality of heating units are utilized for providing heat to the continuous flow reactor, oxidant vessel, and the manganese vessel. The controller is for simultaneously monitoring and adjusting system operational parameters and regulating system components, the controller being in electronic communication with the probes of the oxidant vessel, the manganese vessel, the continuous flow reactor, the feeders, the at least one filtration and/or rinse unit, the back pressure valve and the heating units. The controller is capable of monitoring and adjusting system operational parameters selected from the group consisting of temperature, pressure, molarity, Eh, pH and feeder rates so as adjust and maintain conditions in the continuous flow reactor within the $MnO_2$ stability area during processing.

The integrated pollution control and sorbent processing system of this embodiment of the invention may further comprise conveyors to direct reacted sorbent from the reaction chamber for processing in the sorbent processing subsystem and to direct process sorbent from the sorbent processing subsystem for introduction into the pollutant removal subsystem. Further, the pollutant removal controller and sorbent processing controller maybe sub-control elements of an integrated system controller.

While exemplary embodiments of this invention and methods of practicing the same have been illustrated and described, it should be understood that various changes, adaptations, and modifications might be made therein without departing from the spirit of the invention and the scope of the appended claims.

What is claimed is:

1. A system for rapid and adaptive processing of oxides of manganese, the system comprising:

a continuous flow reactor equipped with an orifice, a back pressure valve, probes for measuring temperature, pressure, Lh and pH values of aqueous solutions within the continuous flow reactor, the continuous flow reactor being configured for introduction of a heated aqueous oxidizing solution and a manganese containing solution a heated manganese containing solution selected from the group consisting of a slurry of virgin oxides of manganese, a regeneration slurry containing rinsed reacted oxides of manganese, a slurry of loaded oxides of manganese containing disassociated manganese cations, a manganese salt solution containing disassociated manganese cations, the manganese containing solution and the aqueous oxidizing solution being processed together in the continuous flow reactor as a combined mixed processing solution;

a manganese vessel equipped with a feeder, the manganese vessel containing the manganese containing solution;

a oxidant vessel equipped with a feeder, the oxidant vessel containing a supply of the aqueous oxidizing solution, the oxidizing solution being prepared to have Eh and pH values within a permanganate stability area or an $MnO_2$ stability area or to move solution conditions initially into the permanganate stability area or an $MnO_2$ stability area when contacted with the manganese containing solution;

a plurality of heating units for providing heat to the continuous flow reactor, oxidant vessel, and the manganese vessel;

a base and/or acid feeder for feeding base or acid to the continuous flow reactor;

a least one filtration and/or rinse unit; and a controller for simultaneously monitoring and adjusting system operational parameters and regulating system components, the controller being in electronic communication with the probes of the oxidant vessel, the manganese vessel, the continuous flow reactor, the feeders, the at least one filtration and/or rinse unit, the back pressure valve and the heating units; the controller being capable of monitoring and adjusting system operational parameters selected from the group consisting of temperature, pressure, molarity, Lh, pH and feeder rates so as adjust and maintain conditions in the continuous flow reactor within the $MnO_2$ stability area during processing.

2. The system of claim 1, further comprising an electrolytic cell for production of oxidant and other useful by-products, the electrolytic cell being configured to receive and process filtrate and rinse solutions from the at least one filtrationlrinse unit, the solutions being generated from the separation of oxides of manganese processed in the combined mixed processing solution, wherein the controller is in electronic communication with and regulates and controls operation of the electrolytic cell.

3. The system of claim 1, wherein the aqueous oxidizing solution contains an oxidant or oxidizer selected from the group consisting of persulfates, chlorates, perchlorates, permanganates, peroxides, hypochlorites, organic oxidizers, oxygen, air, and ozone.

4. An integrated pollution control and sorbent processing system comprising:

a pollutant removal subsystem for removal of target pollutants from gases, the pollutant removal subsystem comprising:

a feeder containing a supply of sorbent, the feeder being configured to handle and feed sorbent, the sorbent comprising oxides of manganese;

at least one reaction chamber configured to receive sorbent and a gas containing at least one target pollutant, where the gas is introduced at temperatures ranging from ambient temperature to below the thermal decomposition temperature of a reaction product formed by a reaction between the target pollutant and the sorbent and contacted with the sorbent for a time sufficient to effect capture of the target pollutant at a targeted capture rate set point, the target pollutant being captured by reacting with the sorbent to form the reaction product to substantially strip the gas of the target pollutant, the reaction chamber being farther configured to render the gas that has been substantially stripped of the target pollutant free of reacted and unreacted sorbent so that the gas may be vented from the reaction chamber; and wherein differential pressure within the system is regulated so that any differential pressure across the system is no greater than a predetermined level;

a pollutant removal controller for simultaneously monitoring and adjusting system operational parameters, the controller providing integrated control of system differential pressure and other operational parameters selected from the group consisting of target pollutant capture rate gas inlet temperature, sorbent feed rate and any combination thereot wherein differential pressure within the system is regulated so that any differential pressure across the system is no greater than a predetermined level and the target pollutant is removed at their targeted capture rate set points; and a sorbent processing subsystem for rapid and adaptive processing of oxides of manganese, the sorbent processing subsystem comprising:

a continuous flow reactor equipped with an orifice, a back pressure valve, probes for measuring temperature, pressure, Lh and pH values of aqueous solutions within the continuous flow reactor, the continuous flow reactor being configured for introduction of a heated aqueous oxidizing solution and a manganese containing solution a heated manganese containing solution selected from the group consisting of a slurry of virgin oxides of manganese, a regeneration slurry containing rinsed reacted oxides of manganese, a slurry of loaded oxides of manganese containing disassociated manganese cations, a manganese salt solution containing disassociated manganese cations, the manganese containing solution and the aqueous oxidizing solution being processed together in the continuous flow reactor as a combined mixed processing solution;

a manganese vessel equipped with a feeder, the manganese vessel containing the manganese containing solution;

a oxidant vessel equipped with a feeder, the oxidant vessel containing a supply of the aqueous oxidizing solution, the oxidizing solution being prepared to have Eh and pH values within a permanganate stability area or an $MnO_2$ stability area or to move solution conditions initially into the permanganate stability area or an $MnO_2$ stability area when contacted with the manganese containing solution;

a plurality of heating units;

a base and/or acid feeder for feeding base or acid to the continuous flow reactor;

a least one filtration and/or rinse unit; and a sorbent processing controller for simultaneously monitoring and adjusting system operational parameters and regulating system components, the controller being in electronic communication with the probes of the oxidant vessel, the manganese vessel, the continuous flow reactor, the feeders, the at least one filtration and/or rinse unit, the back pressure valve and the heating units; the controller being capable of monitoring and adjusting system operational parameters selected from the group consisting of temperature, pressure, molarity, EH, pH and feeder rates so as adjust and maintain conditions in the continuous flow reactor within the $MnO_2$ stability area during processing.

5. The system of claim 4, wherein the at least one reactions chamber is selected from the group of reaction zones that includes a fluidized bed, a pseudo-fluidized bed, a reaction column, a fixed bed, a moving bed, a serpentine reactor, a section of pipe or duct, and a cyclone.

6. The system of claim 4, wherein the at least one reactions chamber is bag house.

7. The system of claim 4, wherein the pollutant removal controller and sorbent processing controller are sub-control elements of an integrated system controller.

8. The system of claim 4, further comprising conveyors to direct reacted sorbent from the reaction chamber for processing in the sorbent processing subsystem and to direct process sorbent from the sorbent processing subsystem for introduction into the pollutant removal subsystem.

* * * * *